United States Patent [19]
Inoue et al.

[11] Patent Number: 6,115,331
[45] Date of Patent: Sep. 5, 2000

[54] OPTICAL DISK LIBRARY APPARATUS OF DESK-TOP TYPE

[75] Inventors: Kazuhiko Inoue; Satoshi Kubota, both of Kawasaki, Japan

[73] Assignee: Fujitsu Limited, Kawasaki, Japan

[21] Appl. No.: 08/927,996

[22] Filed: Sep. 11, 1997

Related U.S. Application Data

[62] Division of application No. 08/527,914, Sep. 14, 1995, abandoned.

[30] Foreign Application Priority Data

| May 31, 1995 | [JP] | Japan | 7-132984 |
| May 31, 1995 | [JP] | Japan | 7-132985 |
| May 31, 1995 | [JP] | Japan | 7-132986 |

[51] Int. Cl.[7] ................................................ G11B 17/22
[52] U.S. Cl. ................................................ 369/34; 369/36
[58] Field of Search ........................ 369/30, 34, 38, 369/36, 37, 192, 178; 360/98.06, 98.04, 92, 96.5

[56] References Cited

U.S. PATENT DOCUMENTS

| 4,467,421 | 8/1984 | White | 364/200 |
| 4,792,865 | 12/1988 | Baumeister | 369/133 |
| 5,107,474 | 4/1992 | Ishibashi et al. | 369/36 |
| 5,357,495 | 10/1994 | Solhjell | 369/34 |
| 5,384,760 | 1/1995 | Kumakura | 369/38 |
| 5,386,516 | 1/1995 | Monahan et al. | 395/275 |
| 5,392,266 | 2/1995 | Kobayashi et al. | 369/36 |
| 5,442,500 | 8/1995 | Hidano et al. | 360/92 |
| 5,793,714 | 8/1998 | Inoue et al. | 369/30 |

*Primary Examiner*—Ali Neyzari
*Attorney, Agent, or Firm*—Greer, Burns & Crain, Ltd.

[57] ABSTRACT

A tray is provided in an apparatus main body so that it can be freely loaded or unloaded in the depth direction. The tray is enclosed in an enclosing port of the front portion. A plurality of magazine racks each having a plurality of slots which can enclose media are arranged in the depth direction in the tray. The medium in the magazine rack is conveyed between an optical disk drive and the rack by an accessor provided in the apparatus. The magazine rack has a box-shaped rack main body which is opened only in the lateral direction for the loading/unloading direction of the tray in a tray enclosing state. The rack main body has a handle in the upper portion so as to be freely folded down. An emulation unit selects a form by a dip switch. In the first type, all of the optical disk media emulates a hard disk drive of one volume. In the second type, each of a plurality of optical disk media emulates a hard disk drive of one volume. Further, in the third type, a predetermined number of media among the plurality of optical disk media enclosed in the magazine rack are grouped and each group emulates a hard disk drive of one volume.

20 Claims, 31 Drawing Sheets

FIG. 21A

| LUN | HEAD DISK NO. |
|---|---|
| 0 | #00 |
| 1~5 | 6×LUN−1 |
| 6~7 | UNUSABLE |

FIG. 21B

| LUN NO. | DISK NO. | THE NUMBER OF DISKS |
|---|---|---|
| 00 | #00~#04 | 5 |
| 01 | #05~#10 | 6 |
| 02 | #11~#16 | 6 |
| 03 | #17~#22 | 6 |
| 04 | #23~#28 | 6 |
| 05 | #29~#34 | 6 |

FIG. 22

| DISK NO. | INSTALLATION FLAG | YEAR/MONTH/DAY OF STORAGE | THE NUMBER OF LOADING TIMES | THE NUMBER OF LEANING TIMES | FORMAT FLAG |
|---|---|---|---|---|---|
| #00 | 1 | 95/05/15 | 10 | 0 | 1 |
| #01 | 1 | 95/05/15 | 20 | 0 | 1 |
| #02 | 1 | 95/05/15 | 100 | 0 | 1 |
| #03 | 1 | 95/05/15 | 5 | 0 | 1 |
| #04 | 1 | 95/05/15 | 0 | 0 | 1 |
| #05 | 1 | 95/05/15 | 10 | 0 | 1 |
| #06 | 1 | 95/05/15 | 30 | 0 | 1 |
| #35 | 1 | 95/05/15 | 0 | 0 | 1 |

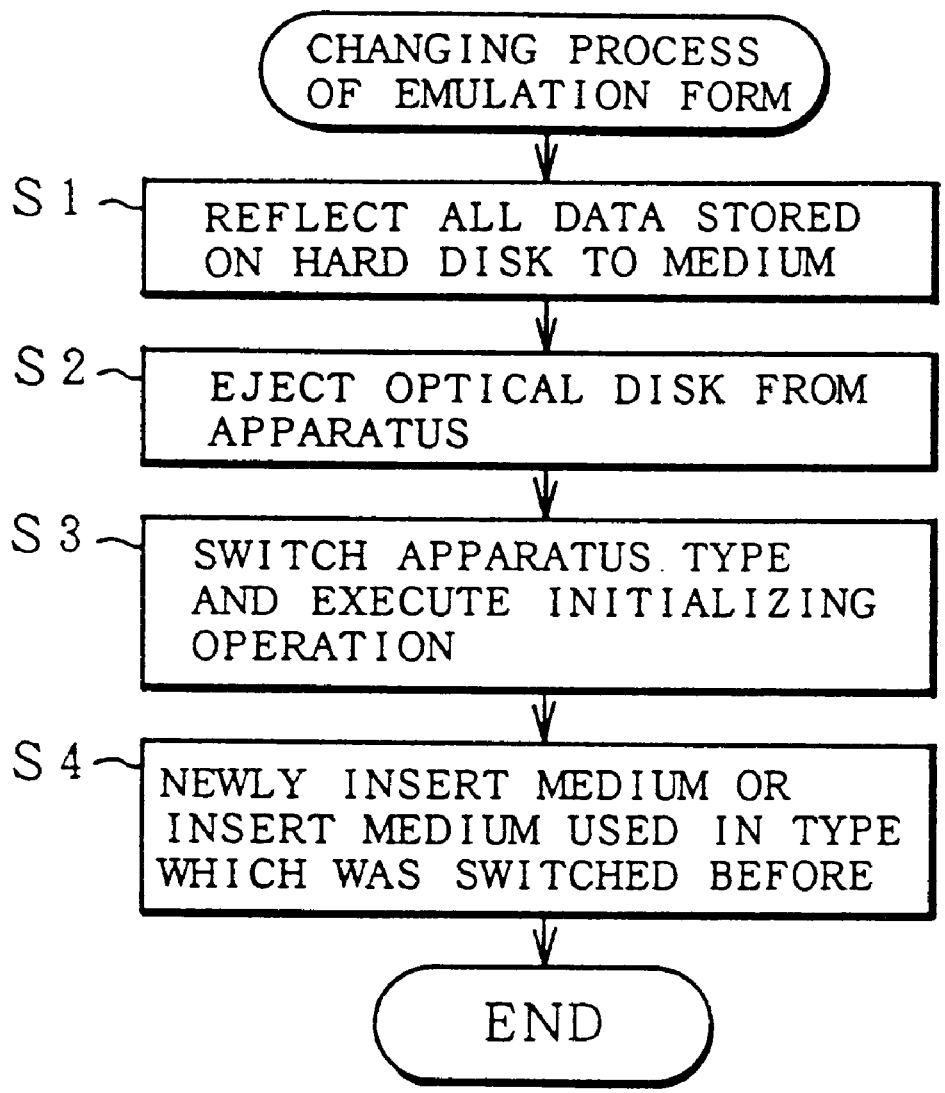

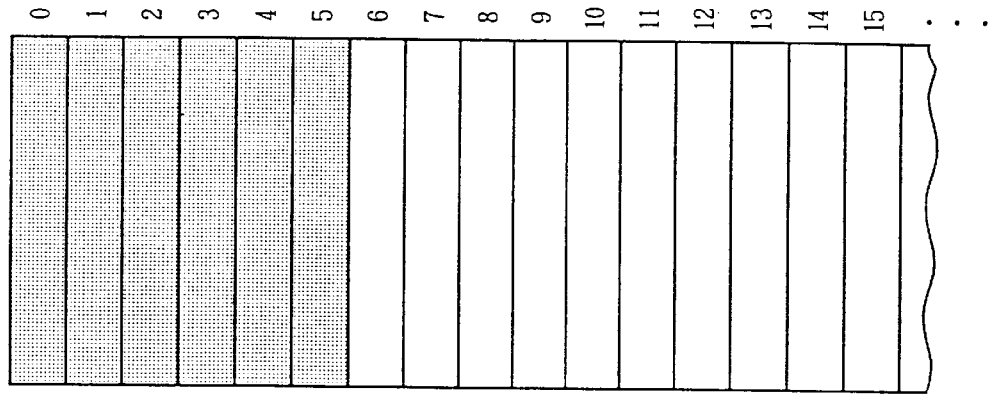
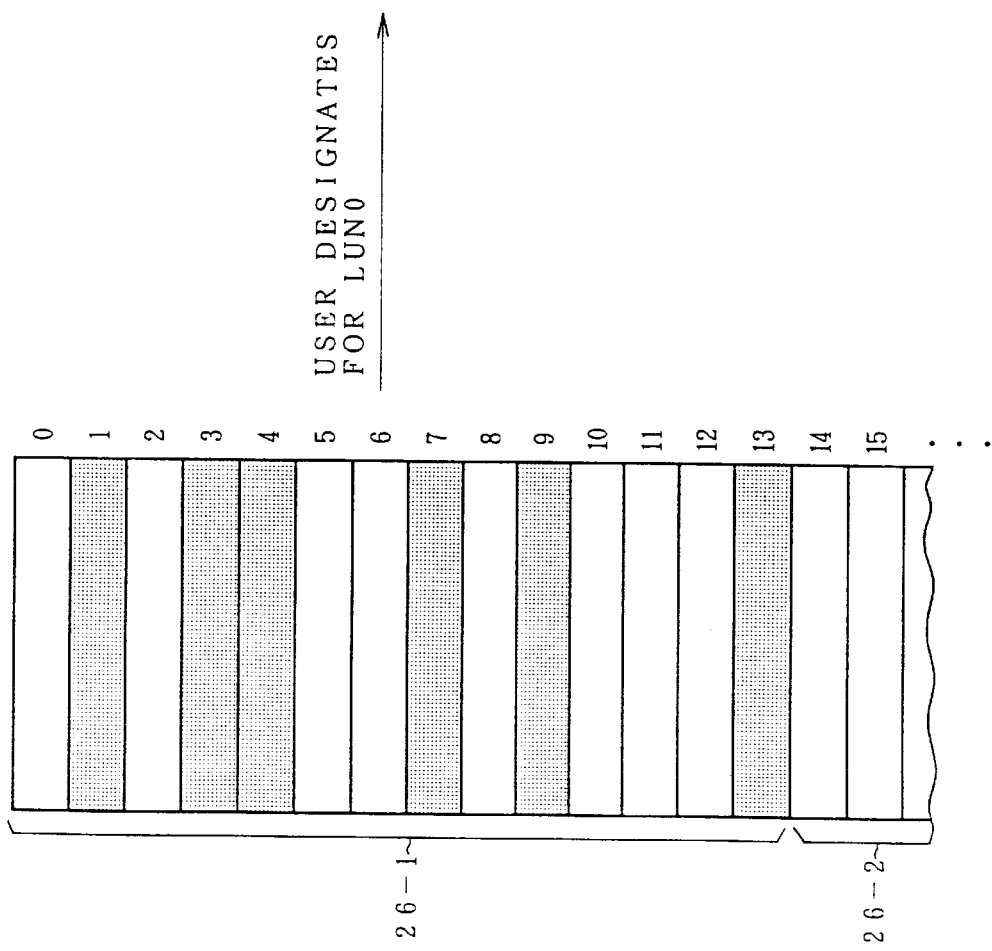

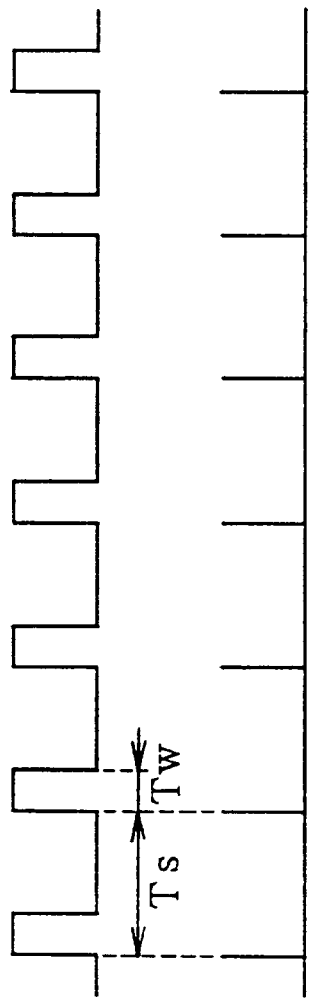
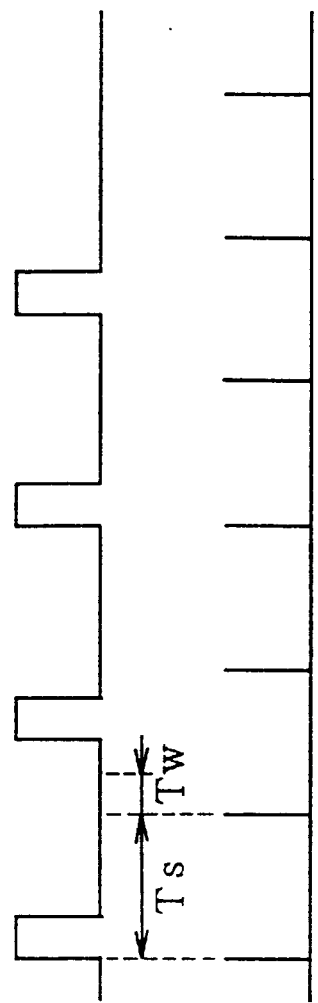
FIG. 31A
FIG. 31B
FIG. 32A
FIG. 32B

OPTICAL DISK LIBRARY APPARATUS OF DESK-TOP TYPE

This is a divisional of application(s) Ser. No. 08/527,914 filed on Sep. 14, 1995 now abandoned.

BACKGROUND OF THE INVENTION

The invention relates to an optical disk library apparatus for selectively loading a plurality of optical disk medium cartridges enclosed in the apparatus into a drive and for recording or reproducing and, more particularly, to a very compact optical disk library apparatus which can be used when it is put on a desk.

An optical disk has advantages such as a large memory capacity exceeding 200 MB. Since it can be enclosed in a cartridge, a medium can be moved between different optical disk drives. In recent years, therefore, those advantages are being effectively used in a Windows environment and in an environment that uses a large amount of software. Particularly, in recent years, since the optical disk drive of 3.5 inches has been put into practical use, the reduction in costs and improvement in accessing speed are realized and a performance similar to that of a standard hard disk drive (HDD) of the previous generation is obtained. However, since the sole optical disk cartridge itself has a limitation in memory capacity, an optical disk library apparatus in which a plurality of optical disk cartridges are enclosed and a necessary optical disk cartridge is picked up by a robot hand and is loaded into the optical disk drive and therecording or reproducing is executed has been proposed.

Until now, a small desk-top optical disk library apparatus had a height almost equal to a height of a desk. The optical disk library apparatus can be installed under a desk and used as an external memory apparatus of a personal computer or a memory apparatus of a server machine. According to such a desk-top type optical disk library apparatus, a medium insertion/ejection port is provided in the outside of the apparatus and, when an optical disk cartridge is placed in the medium insertion/ejection port, an internal accessor conveys the cartridge to a designated cell of, for example, a rotatable cell drum and places it therein. When there is an access request from a host computer, the accessor picks up the cartridge in the cell on the moving side and conveys the cartridge to a drive on the movement destination side and loads it therein. The cartridge which was used is conveyed from the cell drum to the medium insertion/ejection port by the accessor and is ejected out of the apparatus.

In such a conventional desk-top type optical disk library apparatus, although 100 or more cartridges can be enclosed, due to an increase in memory capacity of the optical disk medium in recent years, assuming of the same memory capacity is required, the number of necessary cartridges remarkably decreases. For example, although the conventional optical disk of 3.5 inches has a memory capacity of about 100 MB, since the memory capacity has been increased to a value such as 230 MB which is two or more times larger than the conventional optical disk, the number of cartridges necessary for the optical disk library apparatus is reduced to half or less.

As mentioned above, in the case where the number of cartridges to be enclosed is reduced to, for example, 50 or less, the optical disk apparatus having a cell drum and a medium insertion/ejection port which are similar to those of the conventional apparatus has problems because the number of cartridges which can be enclosed is larger than the necessary number, and the mechanism structure that conveys cartridges between drives, cell drums, and insertion/ejection ports is complicated, expensive and large. As a result, it becomes difficult to find an adequate area to install the apparatus.

Further, in case of using the optical disk library apparatus as an external memory apparatus of a host computer, hitherto, input/output processes by an OS of the host computer have been formed for a hard disk as a target and it is not practical to prepare an OS according to the optical disk drive.

Therefore, hitherto, a hard disk emulation apparatus which operates by making the optical disk library apparatus look like a hard disk for an access from the host computer is used for the optical disk library apparatus as a target. In the conventional apparatus, therefore, an emulation format is fixedly set in accordance with the input/output processes for a hard disk prepared in the OS of the host computer.

In case of fixedly setting a hard disk emulation function, however, there is a situation such that it doesn't conform with specifications required by the user or a situation such that the library apparatus cannot be used due to a limitation or the like by the OS of the host computer which is connected. Since the optical disk library apparatus having the hard disk emulation function is made to look like a hard disk drive to the host computer, each medium cartridge cannot be managed. Consequently, problems can occur when the medium cartridge is taken out of the library apparatus for maintenance, etc. because the medium must be returned to its original format, which creates a high risk for errors.

SUMMARY OF THE INVENTION

According to the invention, there is provided an optical disk library apparatus which has a compact apparatus shape in spite of the fact that the number of media which can be enclosed is large and which can be used by being put on a desk.

An optical disk library apparatus of the invention has an apparatus main body having a flat box-like shape which is long in the lateral direction and the depth direction and whose height is limited so that it can be put on a desk. A tray is provided in the apparatus main body so that it can be freely inserted or removed in the depth direction. The tray is enclosed in an enclosing port of the front portion and a plurality of magazine racks having a plurality of slots each of which can enclose a medium are arranged in the depth direction. The medium of the magazine rack is conveyed between the magazine rack and the optical disk drive by an accessor provided in the apparatus. The apparatus main body has a double plate structure in at least side wall portions of a housing and has a rigidity such that it can endure a weight when an object is put on the apparatus main body. A housing structure on the base side of the apparatus main body has a double plate structure. A mechanism structure including the tray and accessor is installed on a base plate on the inner side of the double plate structure. A circuit unit is installed on a base plate on the outer side. Both of them can be individually assembled, adjusted, and repaired.

A gap is formed in the double plate structure of the housing on the base side. An inflow hole and an exhaust hole for air are opened in the base plate on the inner side. The gap in the double plate structure of the base housing is used as an air duct for cooling. In this case, a passage for allowing the cooling air taken by a fan from an air intake port of the housing to pass through the inside and to flow to the exhaust port is provided. A power supply unit of the apparatus is provided in front of the exhaust port of the passage. The air duct of the gap of the double plate structure of the base housing is used as an inflow passage of the air for the supply unit. By setting the passage for the cooling air, the heat of the power supply unit of the largest heat generation doesn't enter the apparatus, so that a high cooling efficiency is derived.

The tray has a shelf plate of an L-character cross section having a bottom wall and one side wall in the depth direction adjacent to a cover of the front portion. The magazine rack is detachably installed in the lateral direction on the shelf plate. A rack stopping portion is provided at an opening edge of the bottom wall of the tray. A locking member is provided on the inside of the side wall. A driving mechanism to insert or eject the tray is arranged in a gap between the bottom wall and the base side of the housing. The driving mechanism of the tray is a thin driving mechanism which has a gear belt that is rotated by a motor and in which a predetermined position of the gear belt is fixed to the tray, thereby inserting or ejecting the tray.

A controller of the tray driving mechanism recognizes a button operation of an ejection switch in an enclosing state of the tray and opens the tray from the apparatus main body. The controller recognizes a button operation of the ejection switch in the tray open state and closes the tray. The controller can also arbitrarily set a release amount of the tray.

The insertion or ejection of the medium is fundamentally executed on a magazine rack unit basis. However, when the tray collides with an object and cannot be perfectly opened, namely, when an open amount of the tray is equal to or less than a predetermined open amount in which the magazine rack locating at first cannot be attached/detached, the open amount of the tray is set to a slightly small value. In this case, when the tray is closed, the accessor moves to the other slot position and exchanges the medium inserted at the opening position of the tray. The tray driving mechanism has a sensor for generating a detection signal each time the tray is moved by a predetermined distance. The controller sets a predetermined monitoring time zone at every predetermined sampling interval during the movement of the tray. When the detection signal of the sensor is not obtained for such a monitoring time zone, it is judged that an abnormal operation of the tray has occurred. However, a moving speed of the tray is influenced by a weight of the tray which depends on the number of media enclosed in the magazine rack. There is a fear such that even if the tray normally moved, it is judged as an abnormal operation. To prevent such a drawback, the controller measures a sampling period from an output period of the detection signal of the sensor at the start of the movement of the tray and sets a predetermined monitoring time zone at every measured sampling interval, thereby preventing that the moving speed is influenced by the speed change due to the weight.

According to such an optical disk library apparatus of the invention, although the number of optical disk cartridges which can be enclosed is equal to a relatively large number such as 36 (one of them is a cleaning disk), a compact apparatus shape in which a height is equal to about ten and a few centimeters, a lateral width is equal to about ten and a few centimeters, and a depth is equal to about tens of centimeters can be obtained. Thus, such an apparatus can be used by putting it onto the desk.

A double structure is used as a housing. Even when a display or the like is put on the apparatus, no problem occurs in the operation of the driving function of the accessor to convey the cartridge and the tray. Since the apparatus can also be vertically placed, an installation space is small. According to such a double structure of the housing, not only a rigidity is assured but also a duct of the air for forcedly cooling by a fan is formed, for example, on the bottom portion side. In this case, the power supply unit of the largest heat generation is installed on the exhaust side of the air duct for cooling and a passage of the double structure of the bottom portion is used as an inflow passage which reaches the power supply unit. Thus, a pipe with an internal unit is thermally shut off and the heat of the power supply unit is immediately exhausted to the outside, thereby raising a cooling efficiency.

Further, the insertion/ejection port of the cartridge used in the conventional apparatus is abandoned. The cartridge can be enclosed or ejected by loading or unloading the tray. Moreover, a plurality of detachable magazine racks are prepared in the tray and the cartridges are inserted or ejected into/from the tray, fundamentally, on a magazine rack unit basis. For example, in case of using 36 media, three magazine racks are prepared and twelve cartridges can be enclosed per magazine rack. Therefore, problems with inserting or ejecting the cartridges one by one into/from the apparatus can be eliminated. Since the insertion/ejection port of the cartridge is abandoned, the function for insertion or ejection by the cartridge and the function for enclosing are unified, so that the costs can be reduced and the apparatus can be decreased in size due to such a cost reduction.

According to the invention, the magazine rack having the structure that is optimum for the desk-top type optical disk library apparatus having a tray structure is provided. First, the invention relates to the magazine racks as targets of an optical disk library apparatus, in which the magazine rack has a plurality of slots each for enclosing the medium and a plurality of magazine racks are arranged in the depth direction of the tray which is movably provided in the opening of the front portion of the apparatus. According to the invention, such a magazine rack is characterized in that the magazine rack has a box-shaped rack main body which is opened in only the lateral direction for the loading/unloading direction of the tray in the tray enclosing state and that the rack main body has a handle which can fall freely in the upper portion. The magazine rack has a certain number of slots so that its weight is such that it can be carried by a single hand in a state in which the media are enclosed in all of the slots. For example, in case of using the optical disk cartridge of 3.5 inches as a medium, the magazine rack has twelve slots. In each of the upper and lower surfaces of the magazine racks, the magazine rack has an engaging portion adapted to come into engagement with another magazine rack when the rack is stacked on another rack. For example, engaging projections are formed on the upper surface and engaging receiving holes corresponding to the engaging projections are formed in the lower surface. In a state in which a part of the medium is projected out on the inserting side, the magazine rack encloses the medium in each slot. The magazine rack has an almost cubic shape as a whole in a state in which the media are enclosed in all of the slots. Stoppers adapted to come into engagement with grooves on the medium side are formed at the positions of the upper and lower inner surfaces of the slots. The stoppers are formed integratedly with the rack main body. Further, an anti-insertion preventing nail to prevent a reverse insertion in the vertical direction of the medium is formed on the entrance side of the upper inner surface of the slot. According to the anti-insertion preventing nail, one spring plate formed with nail portions for each slot is fixed to the entrance side of the upper inner surface of the main body. Further, it is desirable that a label indicative of the medium inserting direction is adhered to the side surface of the magazine rack.

According to the magazine rack of the optical disk library apparatus of the invention as mentioned above, the magazine rack is located on the tray in a state in which a plurality of medium cartridges are inserted to the side surface of the box-shape, so that the magazine rack can be easily attached or detached by using the upper handle. The magazine rack has weight and size suitable for the user to easily insert or remove by a single hand, thereby making it easy to insert or remove on a magazine rack unit basis. The magazine racks which are not used can be stacked on the desk by using the upper/lower engaging structure and can be easily arranged in order. In a medium enclosing state, since the magazine rack has an almost cubic shape as a whole, the rack has good stability when it is put on the desk. A space use efficiency in case of stacking the magazine racks is also high. Further, since the medium cartridge is not perfectly enclosed in the magazine rack but is partially projected out, the magazine rack can be constructed in a compact size, so that the apparatus can be reduced in size.

Moreover, since the anti-insertion preventing mechanism of the cartridge is provided, it is possible to prevent the cartridge from being inserted in the wrong direction. In addition, since the label indicative of the inserting direction of the medium cartridge is adhered to the side surface of the magazine rack, the medium cartridge can be inserted in the correct direction in accordance with the label.

According to the invention, there is provided an optical disk library apparatus having a plurality of hard disk emulation formats and an emulation function having a high degree of freedom so that one of them can be selected by the user.

According to the optical disk library apparatus of the invention, a plurality of optical disk media are enclosed in slots of the magazine rack enclosed in the tray that can be freely loaded or unloaded into/from the apparatus main body. The apparatus main body has: an optical disk drive for recording and reproducing an optical disk medium; an accessor for moving the optical disk medium between the magazine rack in the tray and the optical disk drive; an emulation unit for making the optical disk drive look like a hard disk drive to record and reproduce a magnetic disk medium and for processing in response to an access request from an upper apparatus; and type selecting means such as a dip switch for selecting an apparent format of the hard disk drive by the emulation unit. The type selecting means selects one of first to third types.

In the first type, all of the optical disk media enclosed in the magazine rack are made to look like hard disk drives of one volume. In the second type, each of a plurality of optical disk media enclosed in the magazine rack is made to look like a hard disk drive of one volume. Further, in the third type, a predetermined number of optical disk media among a plurality of optical disk media enclosed in the magazine rack are grouped and are made to look like hard disk drives of one volume. In the initializing process in association with the power-on, the emulation unit sets a converting function for converting an effective address from an upper address to an address of the optical disk medium in accordance with the selected first to third types. As such an address converting function, in the case where the selection of the first type is recognized, the address converting function is set such that the quotient obtained by dividing the effective address by the maximum address of the optical disk medium is obtained as an optical disk number and, subsequently, the value obtained by subtracting the value that is derived by multiplying the disk number to the maximum address of the optical disk from the effective address is used as an optical disk address. In the case where the selection of the second type is recognized, the address converting function is set such that the effective address is directly used as an address of the optical disk. Further, in the case where the selection of the third type is recognized, assuming, that the number of hard disks is equal to (N) and the hard disk numbers are set to 0 to (N−1), the value obtained by adding the designated hard disk number to the quotient that is derived by dividing the effective address by the maximum address of the optical disk is obtained as an optical disk number. Subsequently, the address converting function is set such that the value obtained by subtracting the designated hard disk number from the optical disk number is multiplied to the maximum address of the optical disk and the value obtained by subtracting the resultant multiplication value from the effective address is used as an optical disk address.

In the initializing process, the emulation unit checks an installation state of the optical disk medium to each slot of the magazine rack and registers information indicative of the presence or absence of the installation by using the optical disk number as an entry and, when a predetermined installation registration state is derived, sets the address converting function according to either one of the first to third types. In this instance, when the installation registration state of the optical disk medium for each slot of the magazine rack does not satisfy the conditions of the selected type, the installing position of the optical disk medium is corrected so as to satisfy those conditions. The emulation unit registers the registration information indicative of the presence or absence of the installation by using the optical disk number as an entry and, further, registers the management information in association with the use of the optical disk medium. The management information includes, for example, the year, month, and day of the installation, the number of cleaning times, the number of loading times for the optical disk drive, and the like. The emulation unit has a non-volatile memory and saves the latest registration information of the optical disk medium into the non-volatile memory. Further, a hard disk drive which operates as a cache of the optical disk drive is provided for the emulation unit, thereby increasing an accessing speed.

According to such an optical disk drive apparatus of the invention, the user can select a necessary one of a plurality of emulation forms, so that the apparatus can be used more preferably in accordance with the desire of the user. Since the form that is actually used can be selected from a plurality of emulation forms on the library apparatus side, the user is hardly restricted by the OS of the host computer. Further, since the medium serial number is registered when the optical disk medium is stored, whether the disk medium normally operates or not can be managed on a medium unit basis. In addition, at the time for maintenance, since recovery work to return the medium to the correct enclosing position is performed by referring to the management information of the medium, unnecessary steps can be eliminated and manual errors can be reduced.

The above and other objects, features, and advantages of the present invention will become more apparent from the following detailed description with reference to the drawings.

BRIEF DESCRIPTION OF THE DRAWINGS

FIGS. 21A and 21B are explanatory diagrams of logic unit numbers LUN and head disk numbers in the case where the third type is selected;

FIG. 22 is an explanatory diagram of management data in an emulation unit of the invention;

FIG. 23 is a flowchart for an initializing process and a leading process when a power source is turned on;

FIG. 26 is a flowchart for an emulation form changing process;

FIGS. 27A and 27B are explanatory diagrams of an initializing process in the case where unformatted media are inserted at random;

FIGS. 31A and 31B are time charts of a sampling period and a monitoring time zone for a sensor detection pulse when the tray is light;

FIGS. 32A and 32B are time charts of a sampling period and a monitoring time zone for a sensor detection pulse when the tray is heavy.

DETAILED DESCRIPTION OF THE PREFERRED EMBODIMENTS

[Construction of desk-top type apparatus]

Figure 1:
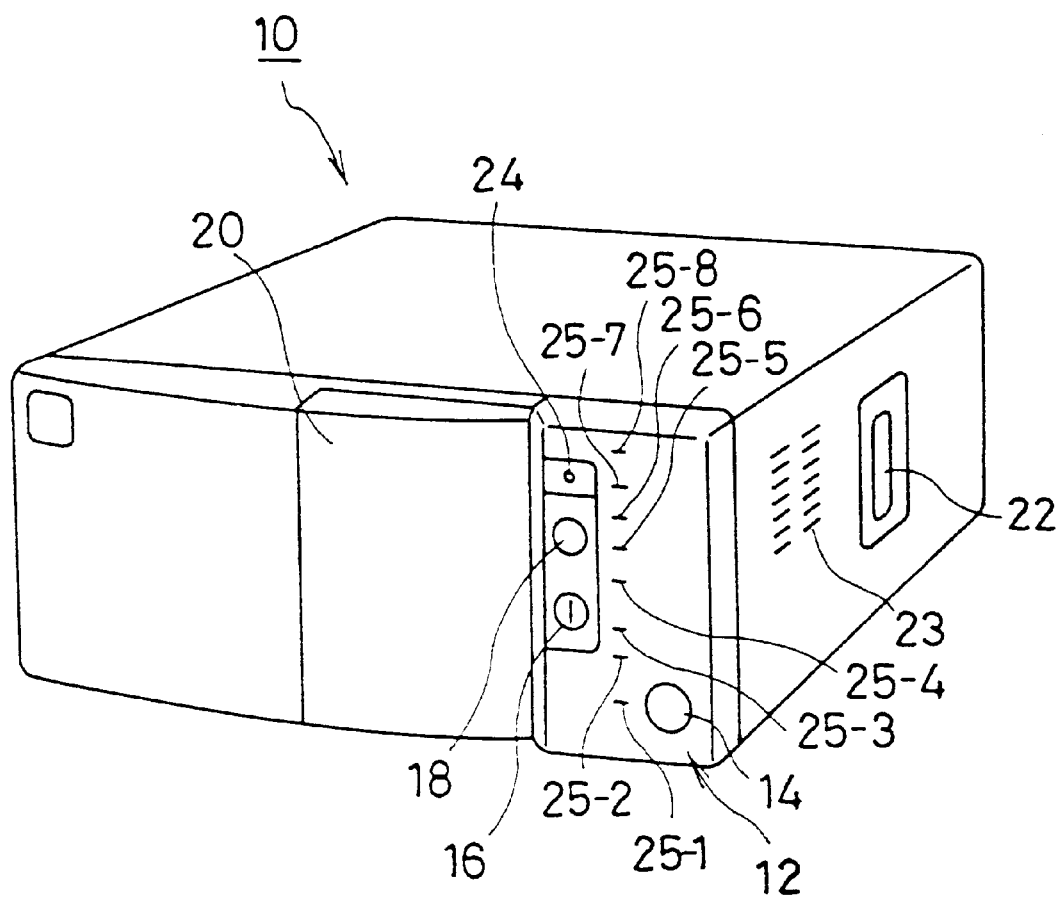
FIG. 1 is an explanatory diagram showing an external view of an apparatus of the invention.
Figure 8:
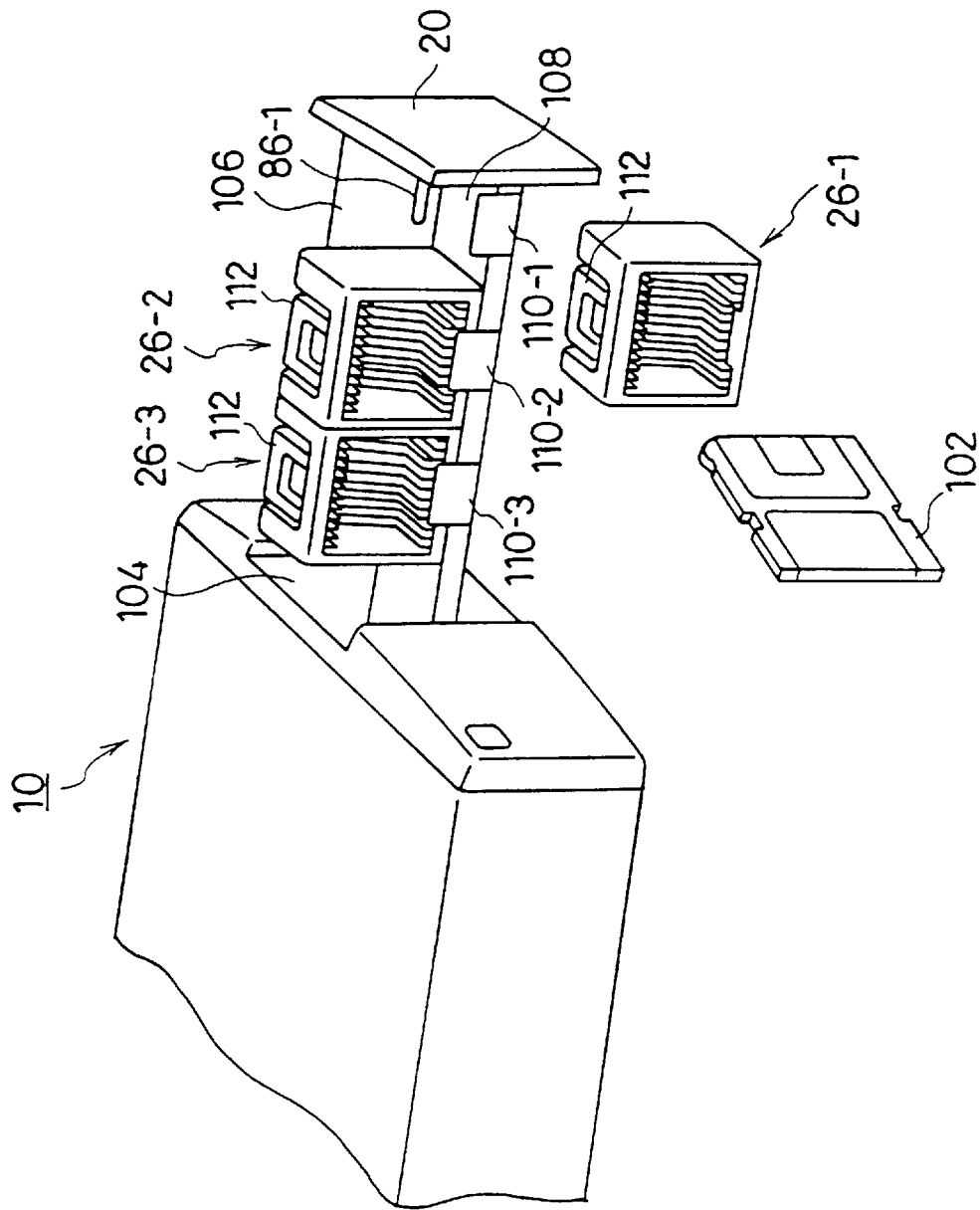
FIG. 8 is an explanatory diagram when a pulling-out state of a tray is seen from the rack attaching/detaching side.
Figure 9:
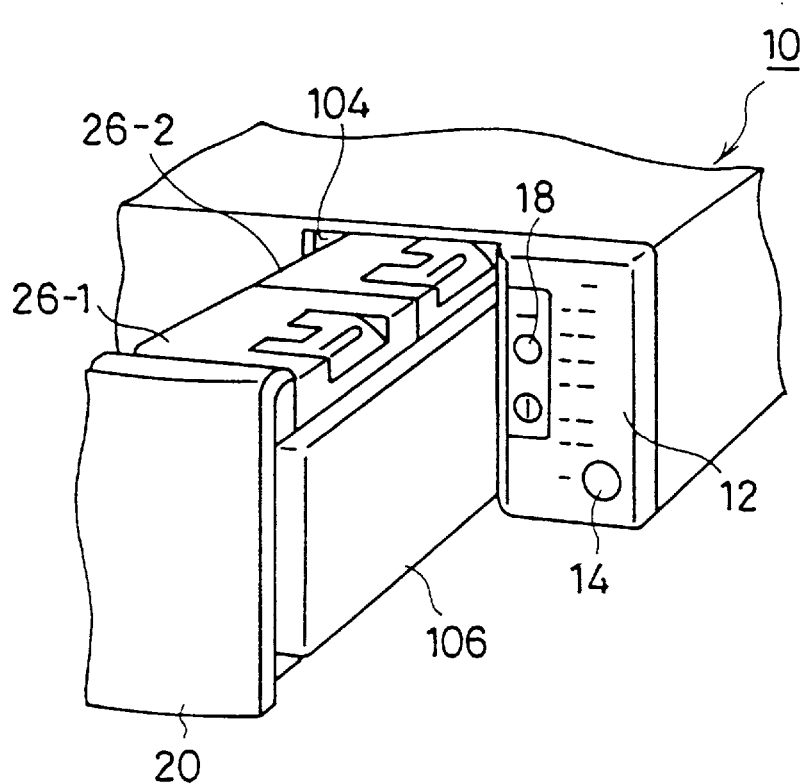
FIG. 9 is an explanatory diagram when the pulling-out state of the tray is seen from the tray rear side.
Figure 10:
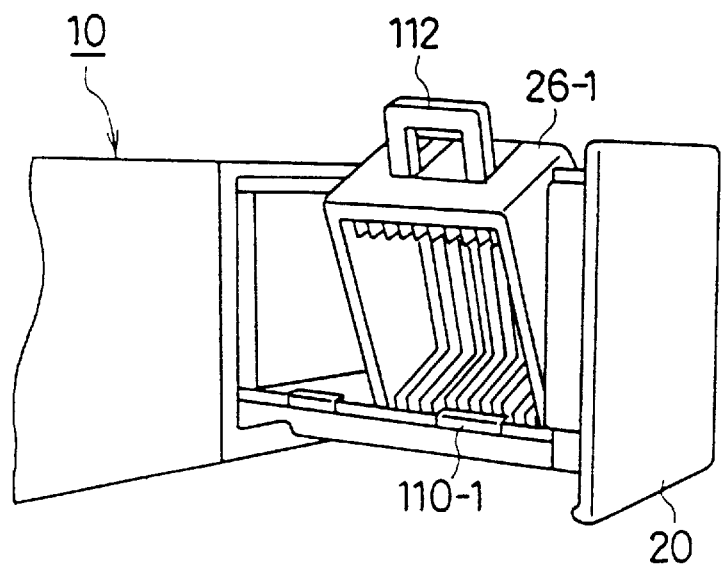
FIG. 10 is an explanatory diagram of a rack attaching/detaching operation for the tray.

FIG. 1 shows an external view of an optical disk library apparatus of the invention. An apparatus main body 10 has a box-like shape whose height is only ten and a few centimeters and which has lengths in the lateral direction and depth direction. For example, the apparatus main body 10 has a very compact size such that a height is equal to 143 mm, a width is equal to 345 mm, and a depth is equal to 430 mm and can be used by putting it on a desk. Since an upper portion of the apparatus main body 10 only occupies an area of a width of 345 mm and a depth of 430 mm, another unit such as a display or the like can be put on the apparatus main body 10 on the desk. A console panel 12 is provided in front of the apparatus main body 10. A power switch 14, a key switch 16, and an ejection switch 18 are provided for the console panel 12. A tray 20 is provided beside the console panel 12. As shown in FIGS. 8 to 10 later, the tray 20 can be loaded or unloaded into/from the apparatus main body 10. Three magazine racks each of which encloses cartridges of optical disk media therein are enclosed in the tray 20. The power switch 14 turns on or off a power source of the apparatus. The ejection switch 18 is depressed to load or unload the tray 20. As shown in the drawings, when the ejection switch 18 is operated in a closed state of the tray 20, the tray 20 is pulled out from the apparatus main body 10. When the ejection switch 18 is operated in a state in which the tray 20 is pulled out, the tray 20 is inserted into the apparatus main body 10. The key switch 16 is used to make effective or cancel the function of the ejection switch 18. In case of pulling out the tray 20 by the ejection switch 18, first, by inserting an exclusive-use key into the key switch 16 and rotating the key, the function of the ejection switch 18 has to be made effective. Ordinarily, the key switch 16 is off, so that even if the ejection switch 18 is operated in an off state of the key switch 16, the tray 20 is not taken out. An on-line indicator 24 is provided in the upper portion of the ejection switch 18. The on-line indicator 24 is lit on when the apparatus main body 10 receives an access from an upper host computer and is operating. Five indicators 25-1 to 25-8 are arranged in the vertical direction on the right side of the ejection switch 18 and key switch 16. Namely, the indicator 25-1, abnormality indicators 25-2 to 25-4, accessor indicator 25-5, hard disk drive indicator 25-6, and optical disk drive indicators 25-7 and 25-8 are arranged from the lower position.

Figure 2:
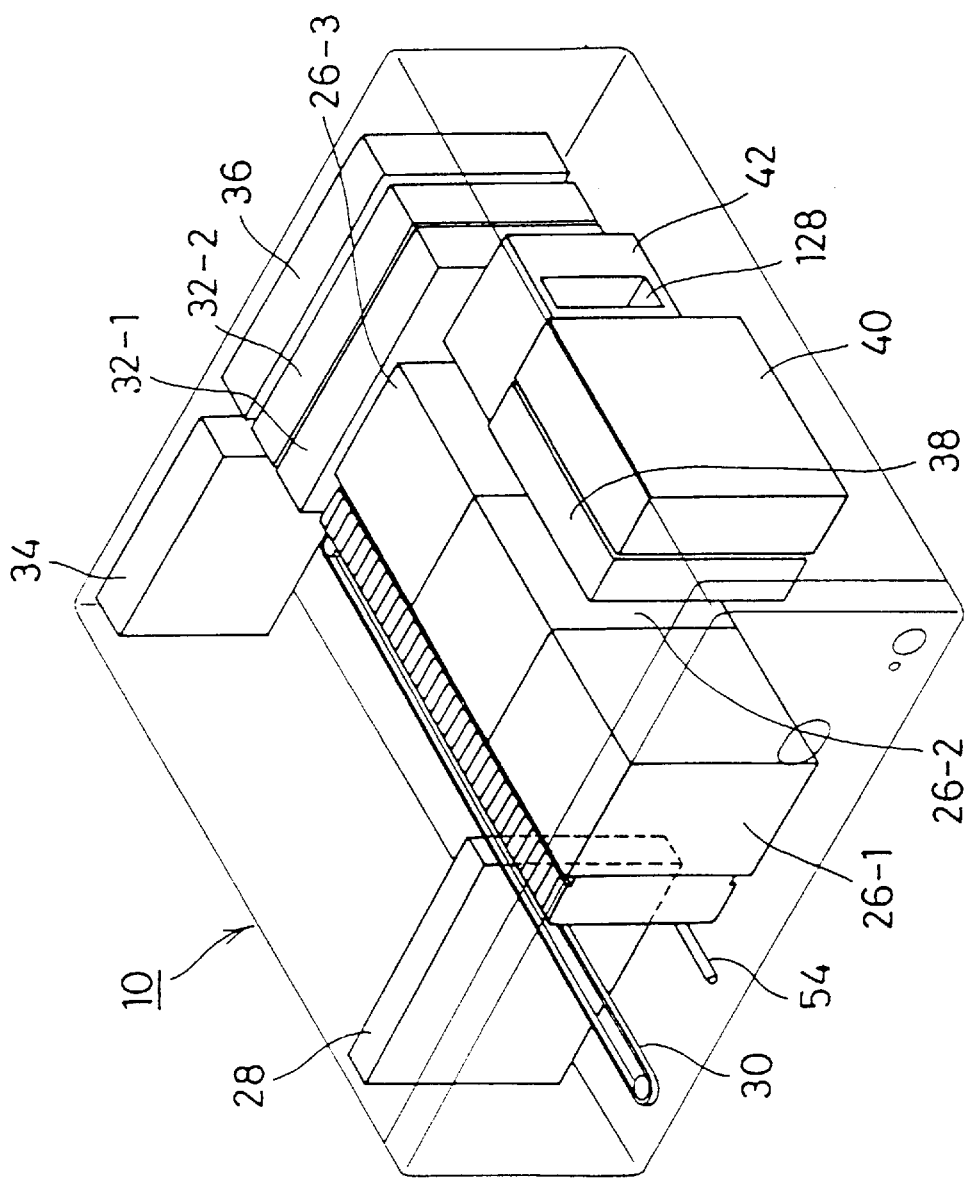
FIG. 2 is an explanatory diagram showing a perspective view of an internal structure.

FIG. 2 shows a perspective view of an internal structure of the apparatus main body 10 in FIG. 1. First, three magazine racks 26-1, 26-2, and 26-3 in the embodiment are enclosed on the rear side of the tray which is opened to the front side. The magazine racks 26-1 to 26-3 are opened to the left. For example, twelve optical disk cartridges of 3.5 inches are enclosed in one magazine rack. Therefore, the total number of optical disk cartridges which can be enclosed in the apparatus main body 10 is equal to 36. However, since one of them is a cartridge for cleaning, 35 optical disk cartridges can be actually used. An accessor 28 is arranged on the left side of the magazine racks 26-1 to 26-3 so as to be movable in the depth direction. The accessor 28 is driven by a gear belt 30 and moves along a guide rail 54. The accessor 28 has a nail for pickup which functions as a robot hand to load or unload the optical disk cartridge to/from the magazine racks 26-1 to 26-3 side. Two optical disk drives 32-1 and 32-2 are arranged on the rear side of the magazine racks 26-1 to 26-3. Each of the optical disk drives 32-1 and 32-2 has a cartridge inserting/ejecting port on the left side at which the accessor 28 is located. Therefore, the accessor 28 takes out a desired optical disk cartridge from either one of the magazine racks 26-1 to 26-3 and conveys to the positions of the optical disk drives 32-1 and 32-2 and inserts it. The accessor 28, in reverse operation, also conveys the optical disk cartridge ejected out from the optical disk drive 32-1 or 32-2 to the original position in one of the magazine racks 26-1 to 26-3 and returns the cartridge therein. A time that is required until the accessor 28 takes out the optical disk cartridge from the magazine rack and inserts it into the optical disk drive is called a cartridge conveying time. In the construction of the apparatus of the invention, the average cartridge conveying time is equal to five seconds, so that a high processing speed is realized. Subsequent to the optical disk drives 32-1 and 32-2, an emulation unit 36 is provided. In response to an access from the upper host computer, the emulation unit 36 makes the optical disk library apparatus look like a hard disk drive and executes processes. A hard disk drive 34 is provided on the left side of the emulation unit 36. The emulation unit 36 controls the hard disk drive 34 as a cache for the optical disk drives 32-1 and 32-2. An accessor controller 38 and a power supply unit 40 are provided on the right side of the magazine racks 26-1 to 26-3. The accessor controller 38 controls the driving of the accessor 28 and tray. The power supply unit 40 supplies a power source to the whole apparatus. A fan unit 42 with a filter is provided on the right side of the power supply unit 40. The fan unit 42 with the filter has a suction port 128 and takes the air from the outside into the apparatus main body 10 through the filter and forcedly cools the internal units by blowing the air into the apparatus by the fan. The cooling air taken by the fan unit 42 with the filter is circulated in the apparatus main body 10. After that, the cooling air finally passes through the portion of the power supply unit 40 and is exhausted to the outside. Such a cooling structure will be clearly explained hereinafter.

Figure 3:
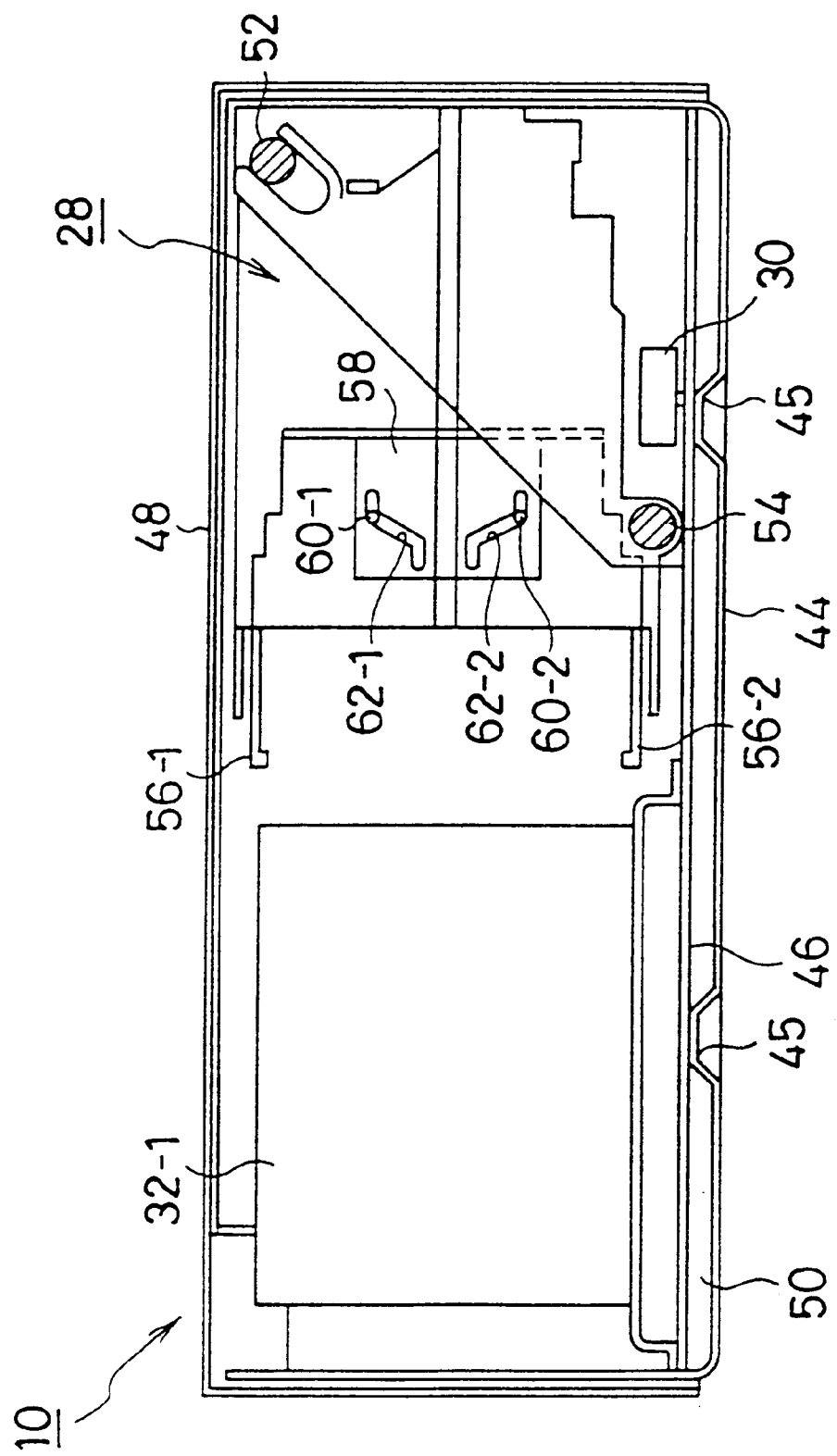
FIG. 3 is a vertical sectional view of an apparatus main body.

FIG. 3 is a vertical sectional view of the apparatus main body 10 in FIG. 2 and shows a state in which the apparatus main body is cut in the portion of the optical disk drive 32-1 and the front side is seen. A housing of the apparatus main body 10 fundamentally has a double-plate structure. First, the base side is constructed by an outer base 44 and an inner base 46. The outer base 44 integratedly has right and left side walls. The inner base 46 is a flat plate and is fixed through a gap 50 that is produced by a formation of dent portions 45 of the outer base 44. The gap 50 between the outer base 44 and the inner base 46 forms a ventilation trunk of the cooling air. A top cover 48 which integratedly has side walls is attached from the upper portion to the base side. Therefore, the side surfaces of the apparatus main body also forms a double-plate structure such that the side wall of the outer base 44 and the side wall of the top cover 48 are overlapped. Further, reinforcing plates 64 and 66 are provided in the top cover 48 as shown in the plan view of FIG. 4 from which the top cover 48 is removed. The double-plate structure in the base side and the double-plate structure in the side walls assures enough rigidity when an article is placed on the apparatus main body 10.

In the double-plate structure on the base side, a mechanical unit having movable portions such as accessor 28, optical disk drives 32-1 and 32-2, tray 20, and the like is attached to the inner base 46. On the other hand, the hard disk drive 34, emulation unit 36, accessor controller 38, power supply unit 40, and fan unit 42 with the filter other than those movable portions are provided on the outer base 44 side. As mentioned above, by installing the mechanical structure having the movable portions including the tray 20, accessor 28., and optical disk drives 32-1 and 32-2 on the inner base 46 side and by providing the other static units like circuits on the outer base 44 side, an assembling adjustment of the mechanical structure having the movable portions at the time of the assembling can be independently performed from the static circuit unit side. Since the whole mechanical structure having the movable portions is provided on the inner base 46 side, the assembling adjustment can be unconditionally executed without considering the relations With the other circuit units. Further, even when performing an inspection repair or the like in association with a failure of the apparatus, with respect to an inspection repair of the mechanical portion, by taking out the inner base 46, the repair adjustment of the sole mechanical portion can be easily performed.

A structure of the accessor 28 will now be described with reference to FIG. 3. The accessor 28 is supported along guide rails 52 and 54 provided at of the right upper corner and the left lower comer so as to be movable in the depth direction. The gear belt 30 is arranged under the accessor 28. The accessor 28 is fixed to a predetermined position of the gear belt 30. The accessor 28 is moved along the guide rails 52 and 54 in response to the movement of the gear belt 30. A pair of upper and lower pickers 56-1 and 56-2 are provided for the accessor 28 so as to be opened on the optical disk drive 32-1 side. By vertically opening or closing, the pickers 56-1 and 56-2 can grasp the optical disk cartridge. By moving guide pins 60-1 and 60-2 along guide grooves 62-1 and 62-2 formed in a guide plate 58, the pickers 56-1 and 56-2 are moved forward or backward and are opened or closed. Instead of using pickers 56-1 and 56-2 with the accessor 28, any handling mechanism can be used so long as it can grasp the optical disk cartridge.

Figure 4:
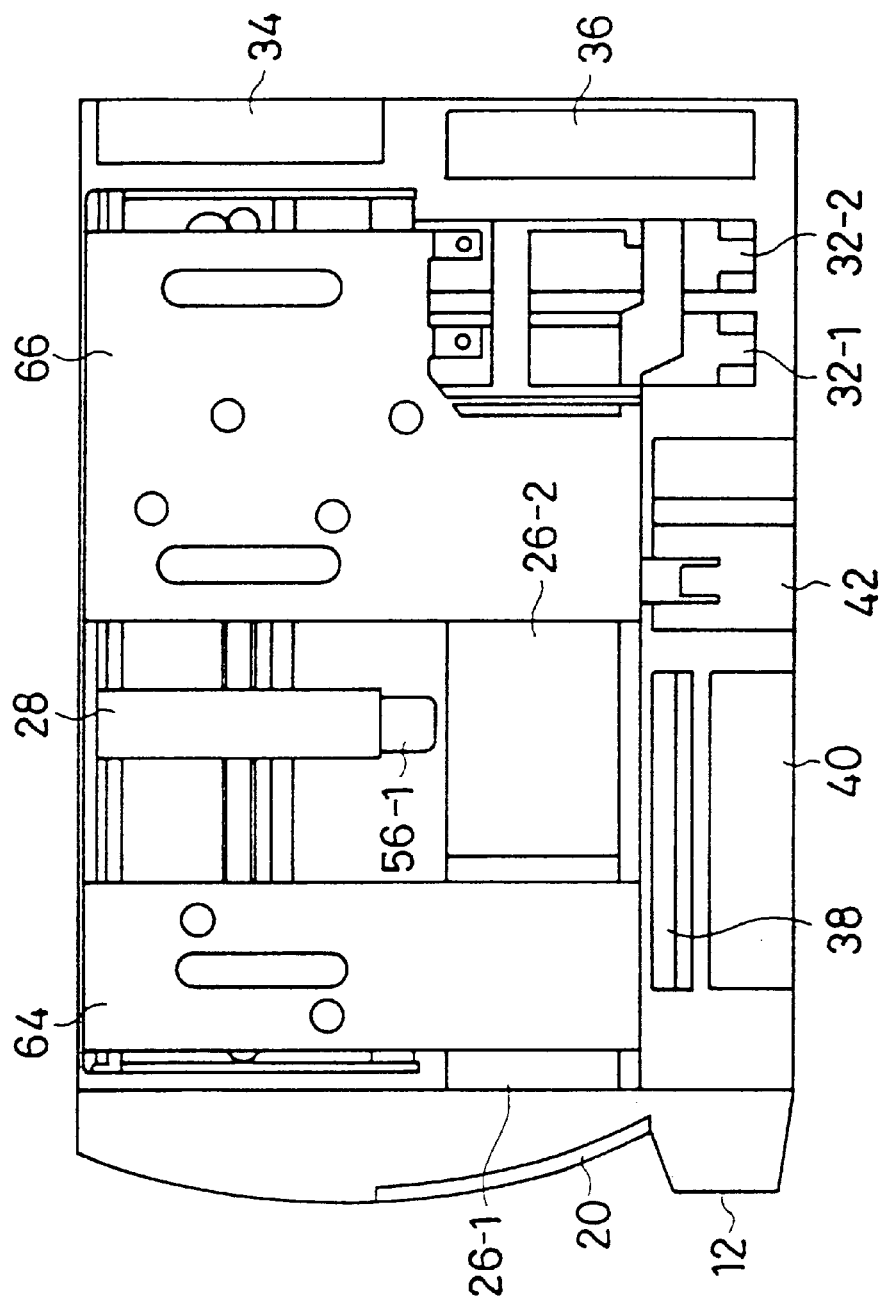
FIG. 4 is a plan view of the apparatus main body from which a top cover is removed.
Figure 5:
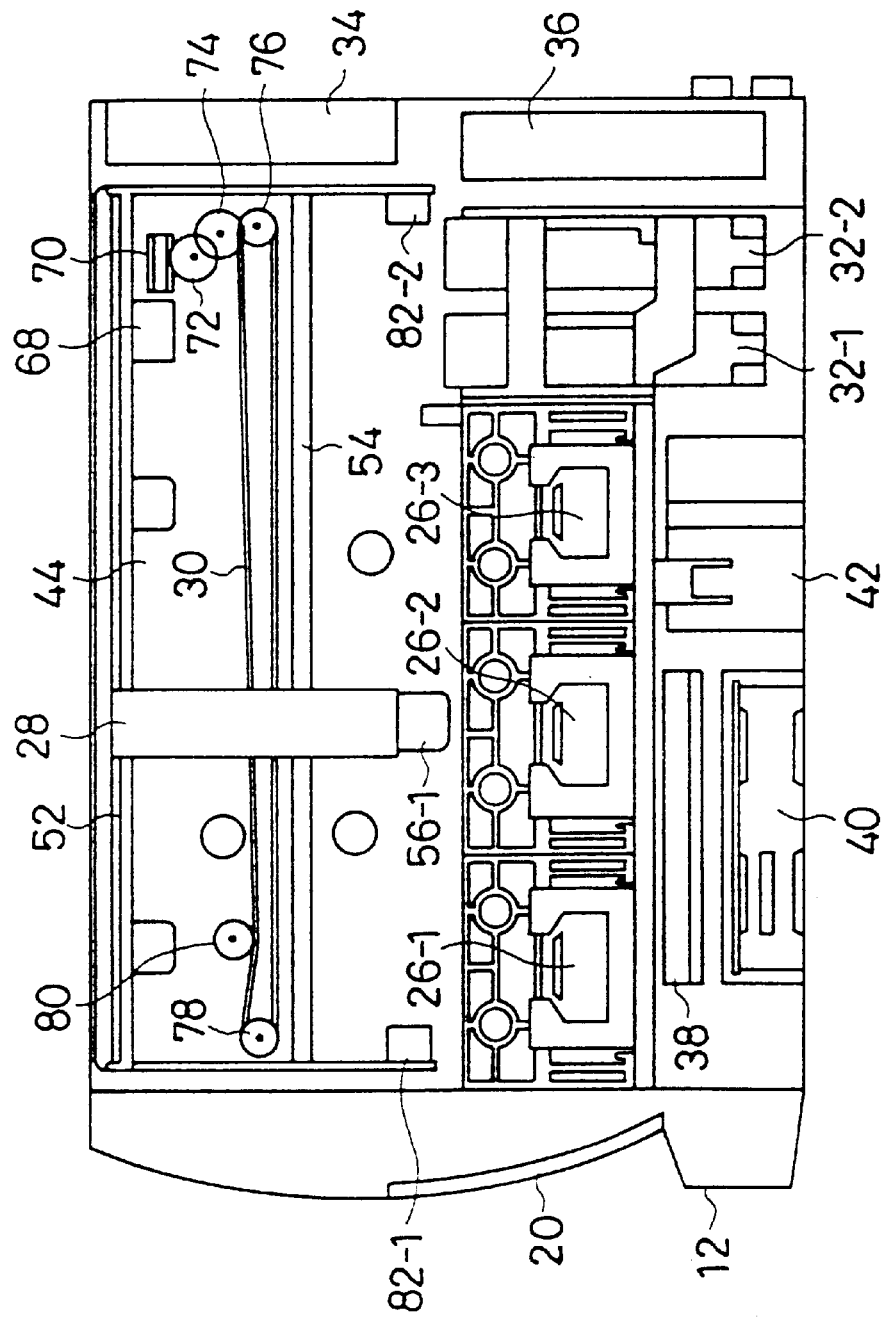
FIG. 5 is a plan view of the apparatus main body from which reinforcing plates in FIG. 4 are removed.

FIG. 4 is a plan view from which the top cover 48 in FIG. 3 is removed. States of the reinforcing plates 64 and 66 provided in the upper portion will be understood from FIG. 4. FIG. 5 is a plan view from which the reinforcing plates 64 and 66 in FIG. 4 are removed. Enclosing states of the three magazine racks 26-1, 26-2, and 26-3 enclosed in the tray 20 will be understood from FIG. 5. A driving mechanism of the accessor 28 is also shown in detail. The driving mechanism of the accessor 28 has a motor 68. The rotation of the motor 68 is transferred from a worm gear 70 to a worm wheel gear 72 and is further transferred to a gear pulley 76 through a gear 74. The gear belt 30 is driven between the gear pulley 76 and a gear pulley 78 provided on the front side. A tension pulley 80 is provided on the gear pulley 78 side, thereby keeping a tension of the gear belt 30 constant.

Figure 6:
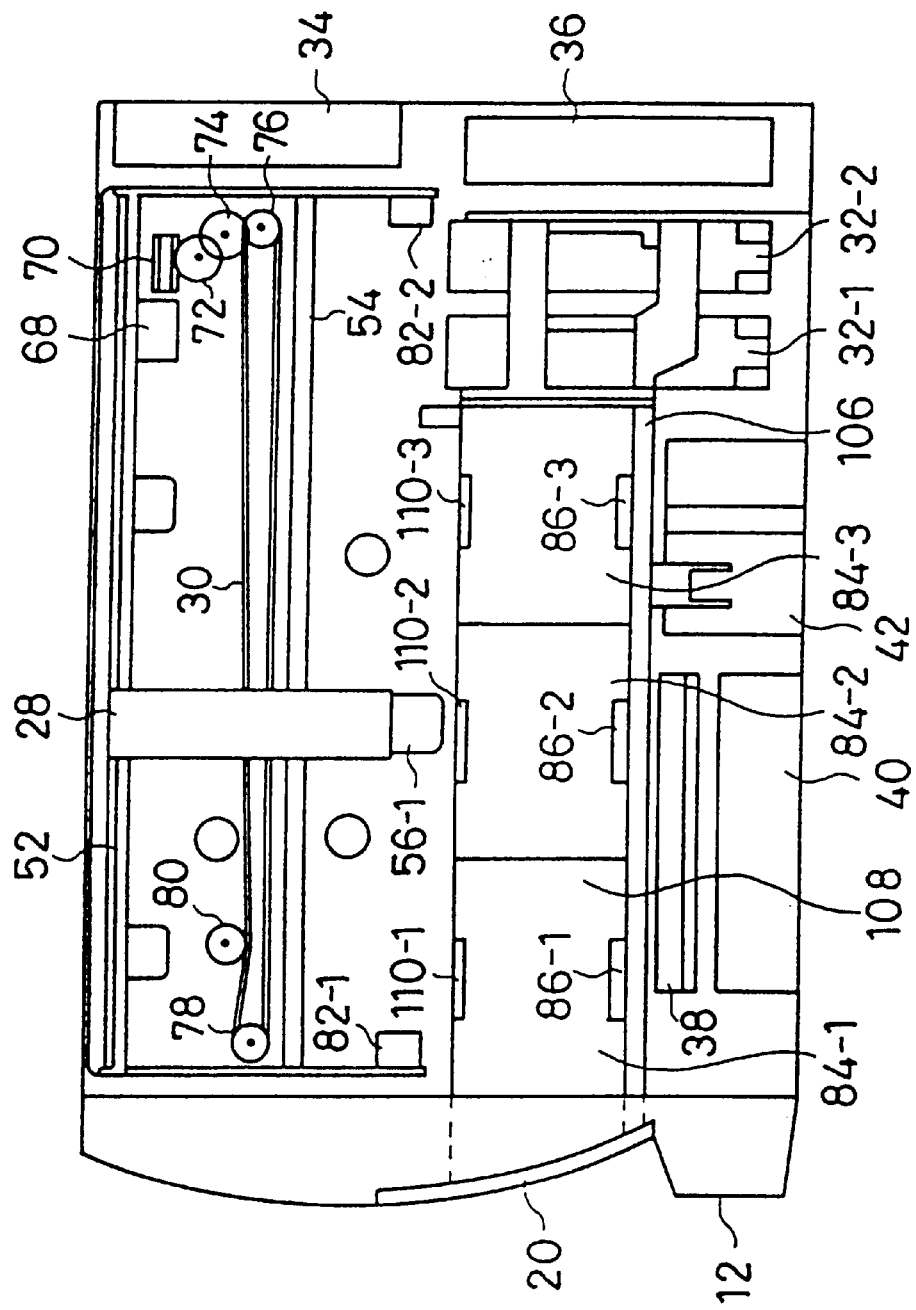
FIG. 6 is a plan view of the apparatus main body from which a magazine rack in FIG. 5 is removed.

FIG. 6 is a plan view showing a state in which the magazine racks 26-1 to 26-3 of the tray 20 in FIG. 5 are removed. The inside of the tray 20 from which the magazine racks are removed has a shelf-plate shape of an L-shaped cross section constructed by a side wall 106 provided on one side and a bottom wall 108. Three magazine enclosing portions 84-1 to 84-3 which are partitioned in the depth direction are formed. Locking members 86-1, 86-2, and 86-3 are provided for the side walls of the magazine enclosing portions 84-1 to 84-3, namely, at the rear positions of the magazine racks, respectively. Pressing members 110-1 to 110-3 are provided in the front edge portion of the bottom wall 108 serving as an accessor 28 side. Therefore, the magazine racks are sandwiched between the rear locking members 86-1 to 86-3 and the pressing members 110-1 to 110-3 at the front edge of the bottom portion and are held in the tray 20.

Figure 7:
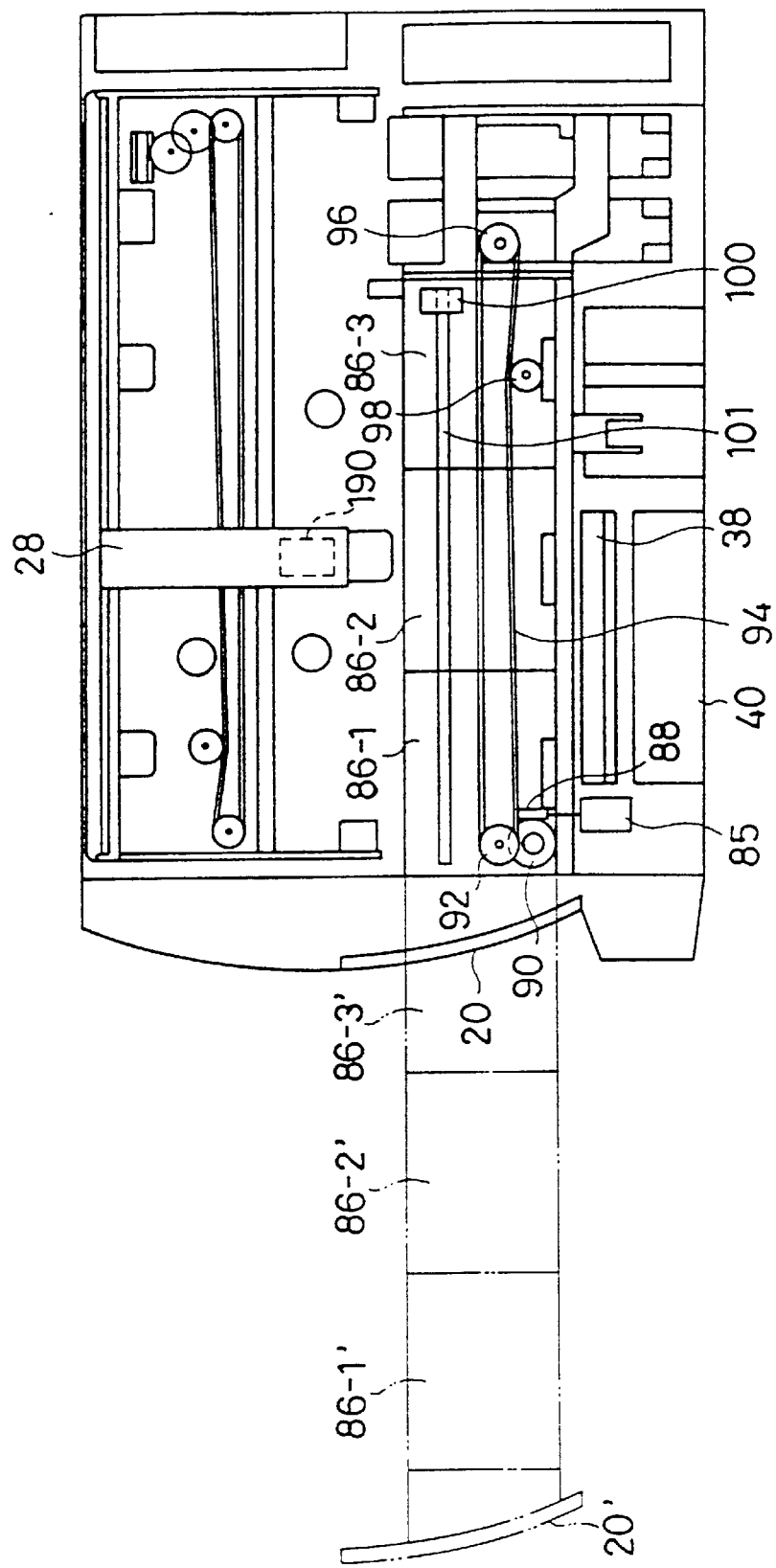
FIG. 7 is a plan view showing a perspective view of a tray driving mechanism.

FIG. 7 is a diagram showing a perspective view of the driving mechanism of the tray 20 that is arranged under the tray 20 in FIG. 6. According to the driving mechanism of the tray 20, a motor 85 is attached in the enclosing portion of the accessor controller 38 and power supply unit 40, and a worm gear 88 attached to a rotary shaft of the motor 85 is rotated by the motor 85, thereby transferring the rotation of the motor 85 to a worm wheel gear 90 and finally rotating a gear pulley 92. A gear pulley 96 is provided at the depth position of the tray for the gear pulley 92. A gear belt 94 is driven between the gear pulleys 92 and 96 and a tension is held constant by a tension pulley 98. A shelf plate of the tray 20 is fixed to the gear belt 94 at a predetermined position. The tray 20 can be opened from an enclosed position to an outside position shown at 20' and can be moved back to the enclosed position by the motion of the gear belt 94. A sensor plate 101 is provided along the moving direction of the tray 20. The moving position of the tray 20 can be detected by a sensor 100 provided on the tray 20 side. As a sensor plate 101, for example, a plate member having a slit to optically detect the position is used for every enclosing position of each of the 36 optical disk cartridges enclosed in the magazine racks installed in the enclosing state of the tray 20. The sensor plate 101 is also used to detect the position of the optical disk cartridge by a sensor 190 provided for the accessor 28. Such a driving mechanism of the tray 20 has a structure in which the worm wheel gear 90, gear pulleys 92 and 96, and tension pulley 98 are provided in parallel with the base plate and the gear belt 94 is driven between the gear pulleys 92 and 96. Therefore, it is sufficient to set a dimension in the height direction of such a driving mechanism to be slightly larger than a width of gear belt 94. By realizing an extremely thin driving mechanism, the height of the apparatus is reduced to a very low height. Such a thin driving mechanism is also similarly applied to the accessor 28 side.

[Structure of tray mechanism]

FIG. 8 shows a state in which the tray is opened in the optical disk library apparatus of the invention. In a state in which the tray 20 is pulled out to the front side from the apparatus main body 10, three magazine racks 26-1 to 26-3 are enclosed in the tray 20. The inside of the tray 20 has a shelf-plate shape of an L-shaped cross section constructed by the side wall 106 and bottom wall 108. The pressing members 110-1 to 110-3 are provided in the front portion of the bottom wall 108. The locking member 86-1 is provided on the rear side like a taking-out portion of the magazine rack 26-1. A handle 112 is attached in the upper portion of each of the magazine racks 26-1 to 26-3. The magazine rack can be removed from the tray 20 with the handle 112 grasped. The magazine rack 26-1 has a plurality of slots on the opening side. A cartridge 102 of the optical disk is enclosed into the slot.

FIG. 9 shows the rear side of the tray in FIG. 8. By operating the ejection switch 18 of the console panel 12, the tray 20 can be opened from a tray enclosing port 104 to the outside by the driving mechanism.

FIG. 10 shows a state in which the magazine rack 26-1 is taken out from the tray 20. When the magazine rack 26-1 is taken out, the handle 112 attached in the upper portion is grasped by the single hand and falls down to the front side around the pressing member 110-1 as a center, thereby disengaging from the locking member 86-1 on the rear side and taking out the magazine rack in this state. Even in case of inserting the magazine rack 26-1 into the tray 20, first as shown in FIG. 10, the lower front edge of the magazine rack 26-1 is set into the pressing member 110-1. In this state, the rack falls down to the rear side and is pushed into the locking member 86-1.

[Cooling Structure]

Figure 11:
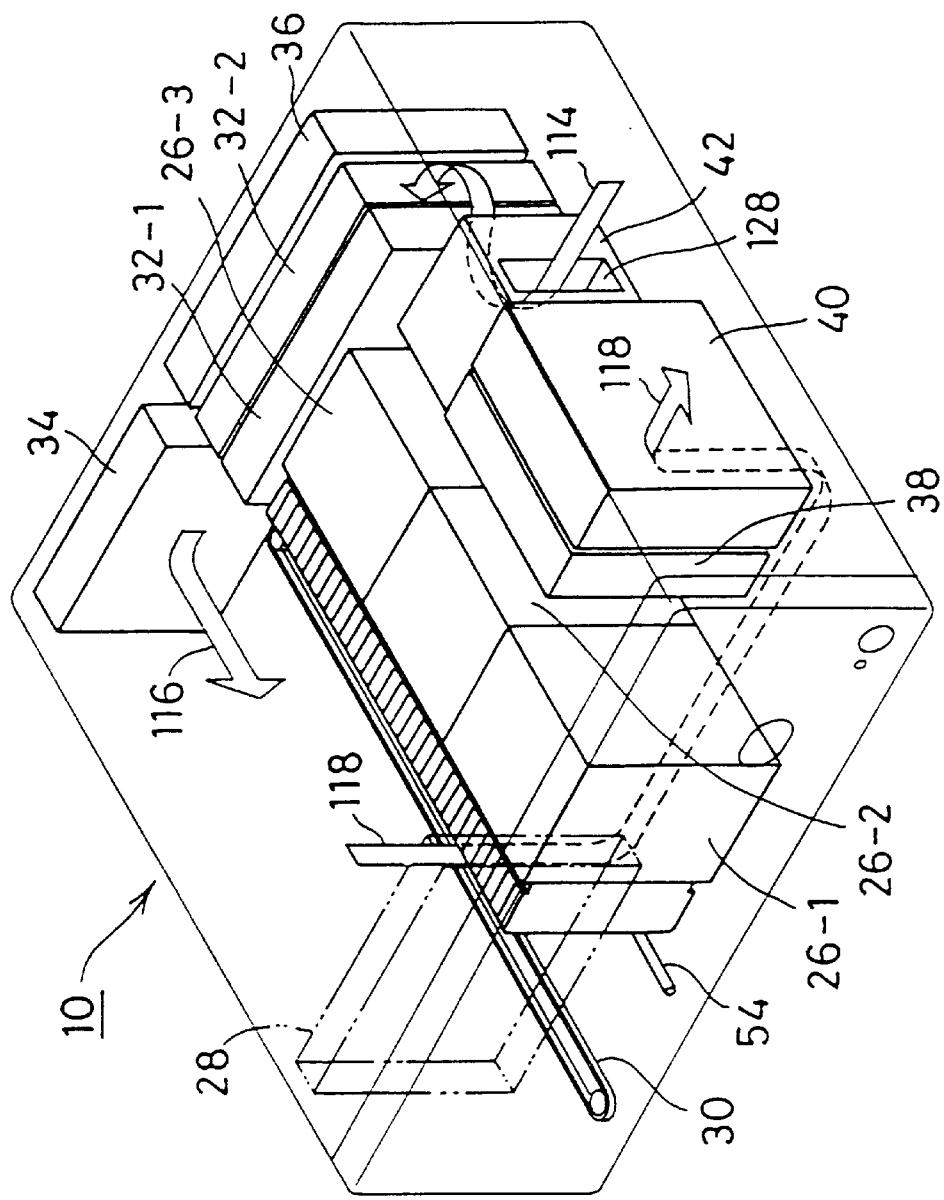
FIG. 11 is an explanatory diagram of a passage for cooling air in the invention.

FIG. 11 shows air flow for cooling in the optical disk library apparatus of the invention. In FIG. 11, the air taken from the suction port 128 of the fan unit 42 with the filter is blown out by the fan as shown by an arrow 114. The air passes through the portions of the optical disk drives 32-1 and 32-2 and emulation unit 36 and is guided to the enclosing portion side of the accessor 28. Although the optical disk drives 32-1 and 32-2 are shown as closed box shapes in FIG. 11, an external cover is not actually attached, so that the air flowing along the direction of the arrow 114 actually passes in the optical disk drives 32-1 and 32. The air flowing into the enclosing portion of the accessor 28 as shown by an arrow 116 enters the bottom portion side of the apparatus main body 10 and passes through a path by the gap 50 between the outer base 44 and inner base 46 shown in FIG. 3. The air rises in the portion of the power supply unit 40 and, after that, is exhausted to the outside as shown by an arrow 118.

Figure 12:
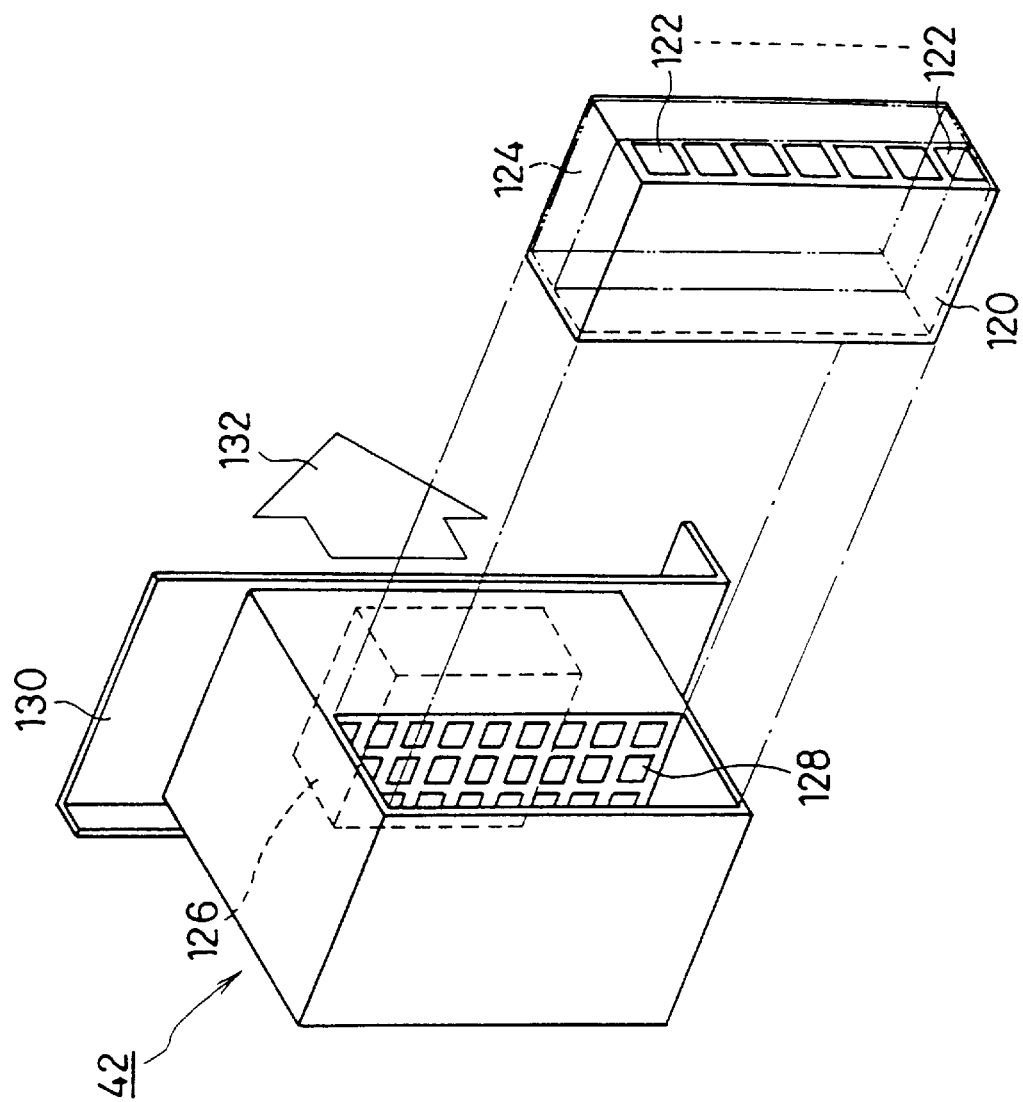
FIG. 12 is an explanatory diagram of a fan unit with a filter which is used in the invention.

FIG. 12 shows the fan unit 42 with the filter in FIG. 11. The fan unit 42 with the filter has a detachable filter casing 120. A plurality of suction ports 122 are opened in the vertical direction in the filter casing 120. A taper filter 124 is enclosed on the right side in the filter casing 120. The suction port 128 is opened on the right side in the filter enclosing portion of the fan unit 42 with the filter. A fan 126 is enclosed in the suction port 128. Therefore, by driving the fan 126, the air flowing in the filter casing 120 is blown into the apparatus as shown by an arrow 132.

Figure 13:
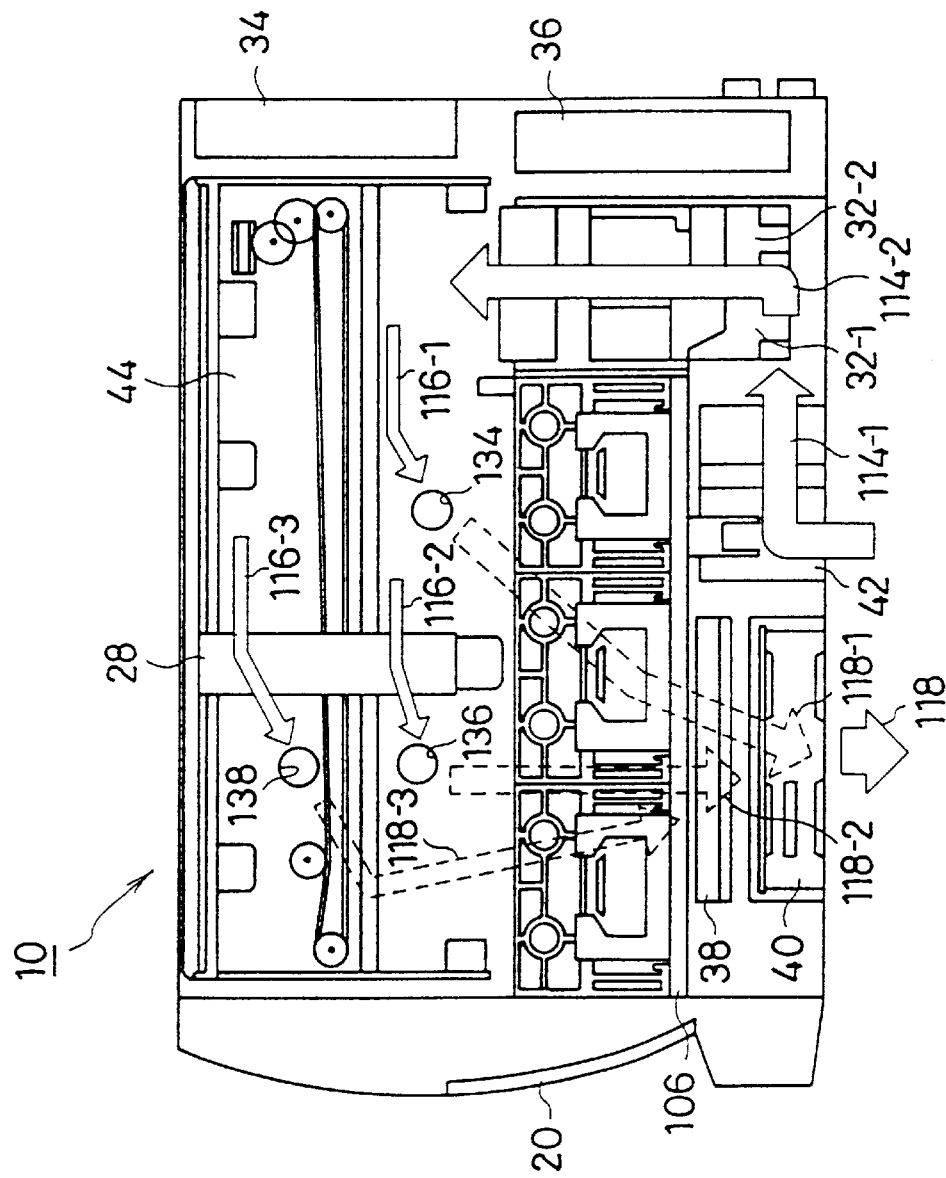
FIG. 13 is an explanatory diagram of the passage for the cooling air when it is seen from a plan view of the apparatus of the invention.

FIG. 13 is a plan view of the apparatus main body 10 from which the top cover is removed and shows a path from the take-in of the cooling air to the exhaustion. The air taken by the fan unit 42 with the filter is blown into the apparatus main body 10 as shown by an arrow 114-1. As a flow of the air, the air passes in the optical disk drives 32-1 and 32-2 and is blown into the installation side of the accessor 28 as shown by an arrow 114-2. Holes 134, 136, and 138 are formed in the inner base 46 of the enclosing portion of the accessor 28. Therefore, the air fed as shown by the arrow 114-2 enters the holes 134, 136, and 138 of the inner base 46 as shown by arrows 116-1, 116-2, and 116-3 and passes through the gap between the inner base and the outer base. The air subsequently flows toward the enclosing portion of the accessor controller 38 and power supply unit 40 as shown by arrows 118-1, 118-2, and 118-3 of broken lines. At the installing position of the accessor controller 38 and power supply unit 40, the outer base 44 is opened to the inside. The air flowing through the gap below the outer base 44 is fed to the installing portion of the accessor controller 38 and power supply unit 40. The enclosing portion of the accessor unit 38 and power supply unit 40 forms a space that is partitioned by an assembly of the side wall 106 of the tray 20 and the fan unit 42 with the filter. The air which passed through the inner base 46 and was fed is exhausted to the outside as shown by the arrow 118. Namely, as will be understood from FIG. 1, an air exhaust port 23 is opened in the exhaust portion of the air in the direction of the arrow 118. The cooling air which passed through the inside of the apparatus main body 10 is exhausted from the air exhaust port 23 to the outside.

Figure 14:
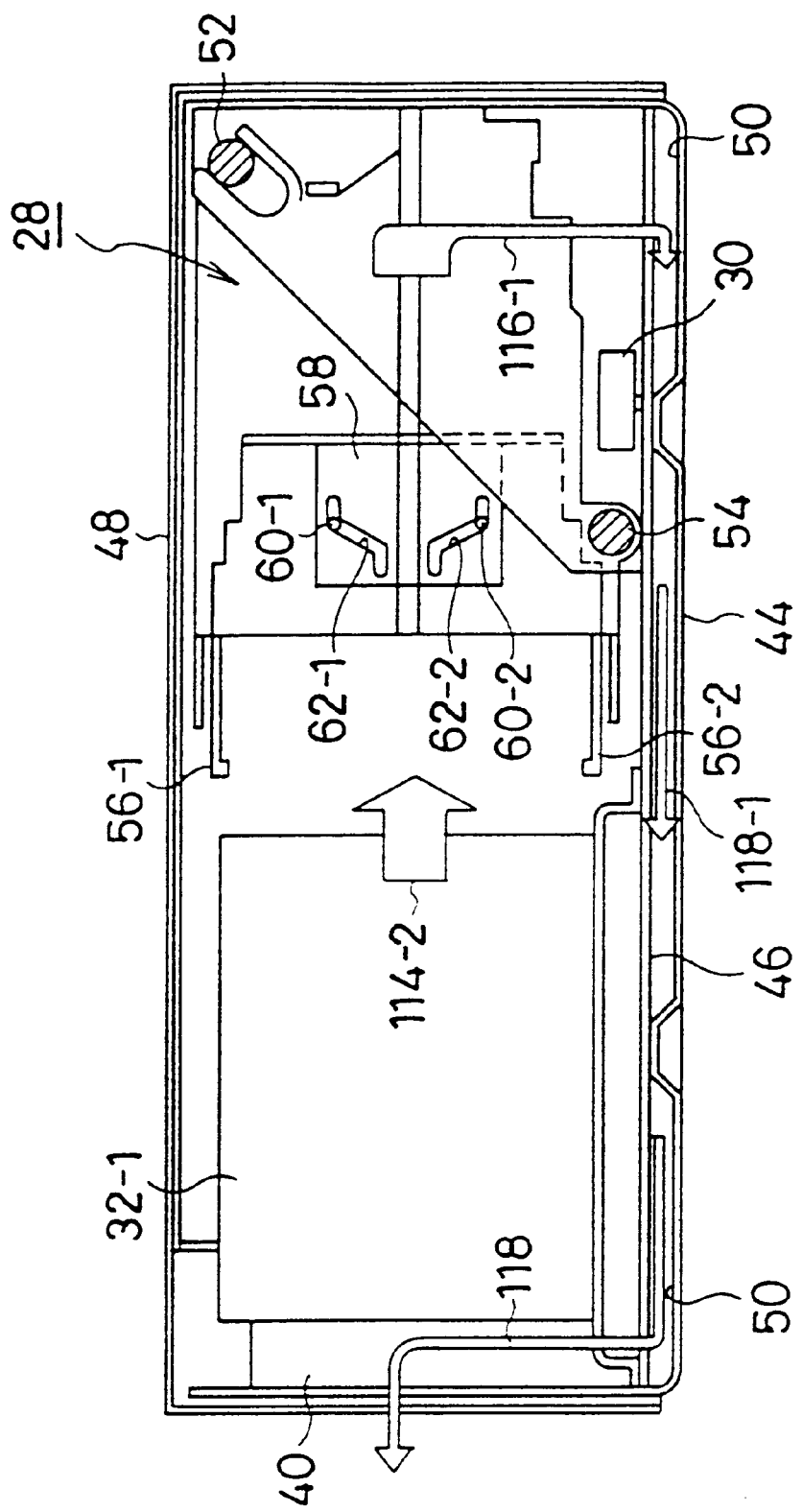
FIG. 14 is an explanatory diagram of the passage for the cooling air when it is seen from a vertical sectional view of the apparatus of the invention.

FIG. 14 is a vertical sectional view of the apparatus main body 10 of FIG. 13. The air fed to the portion of the accessor 28 as shown by the arrow 114-2 passes in the hole as shown by the arrow 116-1 and is blown into the gap 50 between the inner base 46 and the outer base 44. The air subsequently passes in the gap 50 as shown by the arrow 118-1 and rises upward at the installing position of the power supply unit 40 and is exhausted to the outside as shown by the arrow 118. According to such a flow of the cooling air in the apparatus main body 10, the power supply unit 40 of the largest heat generation is attached at the exhaust position as a last position of the flow of the cooling air and the air is not blown from the power supply unit 40 to the inside, so that cooling efficiency can be assured in the apparatus.

[Magazine rack]

Figure 15:
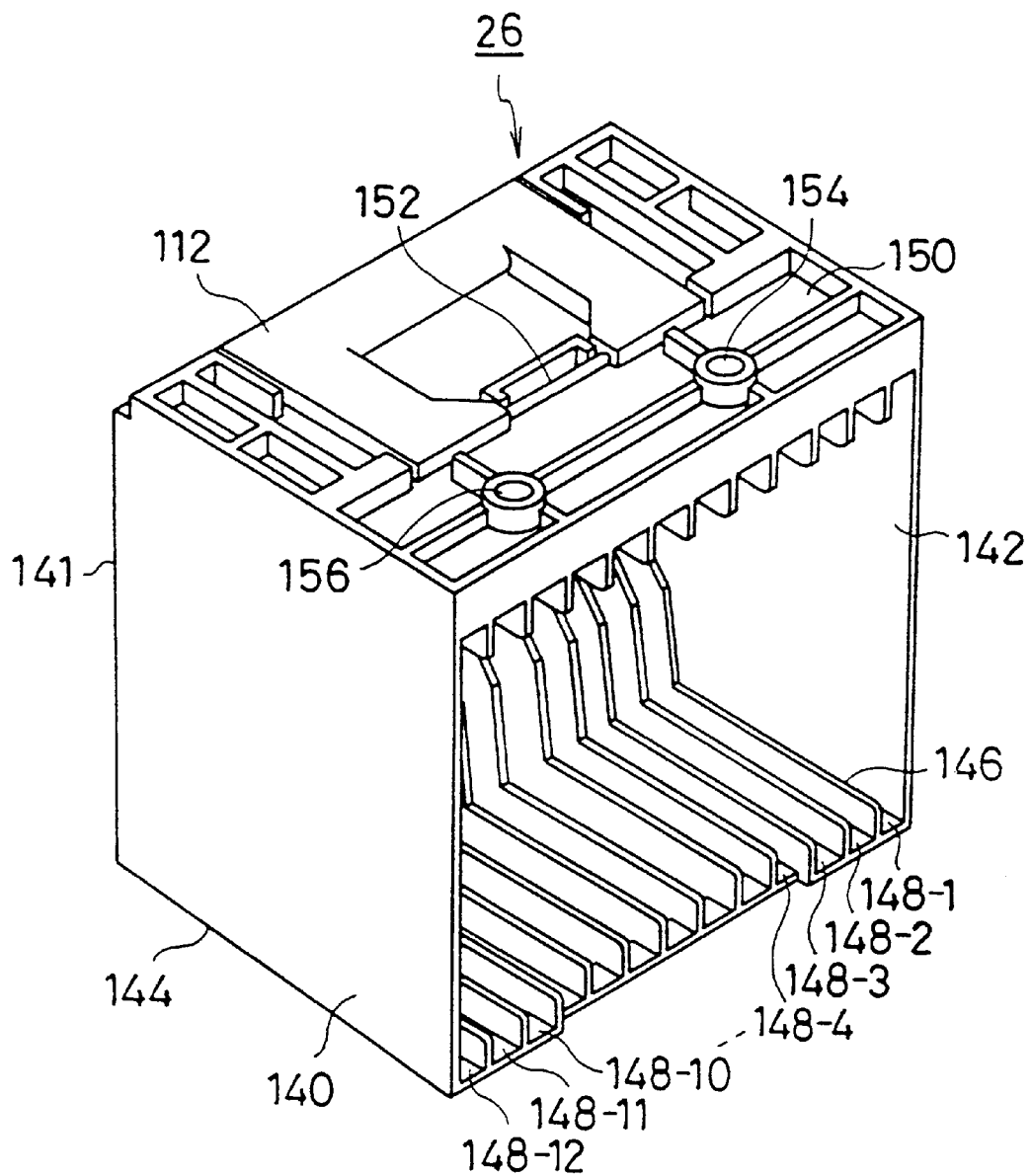
FIG. 15 is an explanatory diagram of a magazine rack that is used in the invention.

FIG. 15 shows the magazine rack that is used in the optical disk library apparatus of the invention. A magazine rack 26 is a box-shaped unit which is opened on only one side and which has left and right side walls 140 and 142, a rear back wall 141, an upper wall 150, and a lower bottom wall 144. A plurality of partitions 146 each of which reaches the upper and lower side and a rear side are integratedly formed in the opening portion of the magazine rack 26. By forming the partitions 146, slots 148-1 to 148-12 are formed to enclose the twelve optical disk cartridges.

The handle 112 that is rotatable by a hinge 152 is provided in the rear portion of the upper wall 150 of the magazine rack 26. The handle 112 is in a state in which it is closed on the same plane as the upper wall 150 by a coil spring (not shown). Projections 154 and 156 are integratedly formed at two positions on the front side of the upper wall 150.

Figure 16:
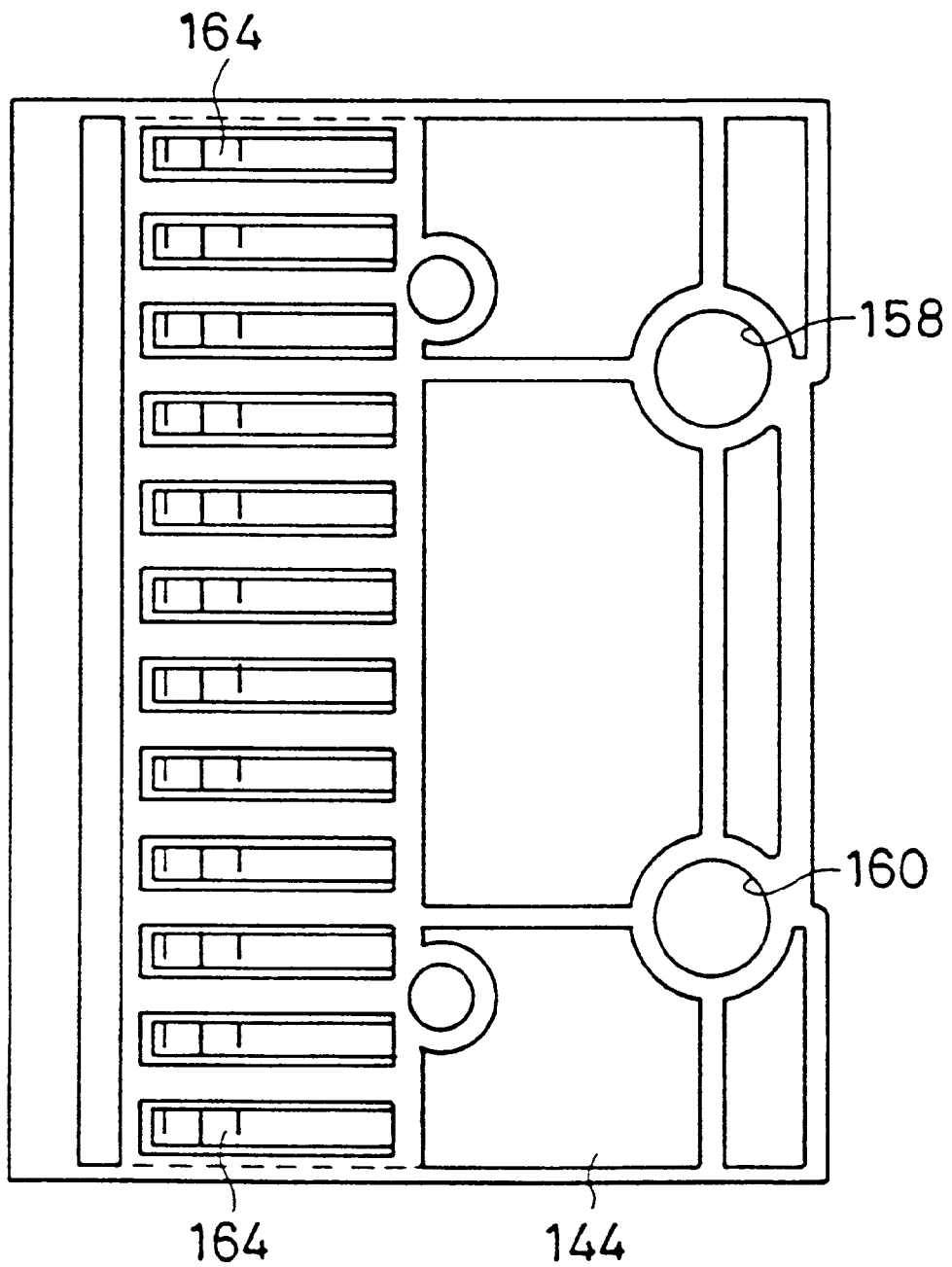
FIG. 16 is a bottom view of the magazine rack of the invention.

FIG. 16 is a bottom view of the magazine rack 26. In correspondence to the projections 154 and 156 provided on the upper wall 150 in FIG. 15, reception holes 158 and 160 are formed in the bottom wall 144. Therefore, in case of arranging a plurality of magazine racks 26 on a desk or the like, the magazine racks 26 can be stacked. Namely, the reception holes 158 and 160 of the bottom wall 144 of the magazine rack 26 to be put on the lower magazine rack 26 are fitted to the projections 154 and 156 formed on the upper wall 150 of the lower magazine rack 26, thereby enabling the upper and lower magazine racks to be stable so as not to be deviated even when they are stacked.

Figure 17:
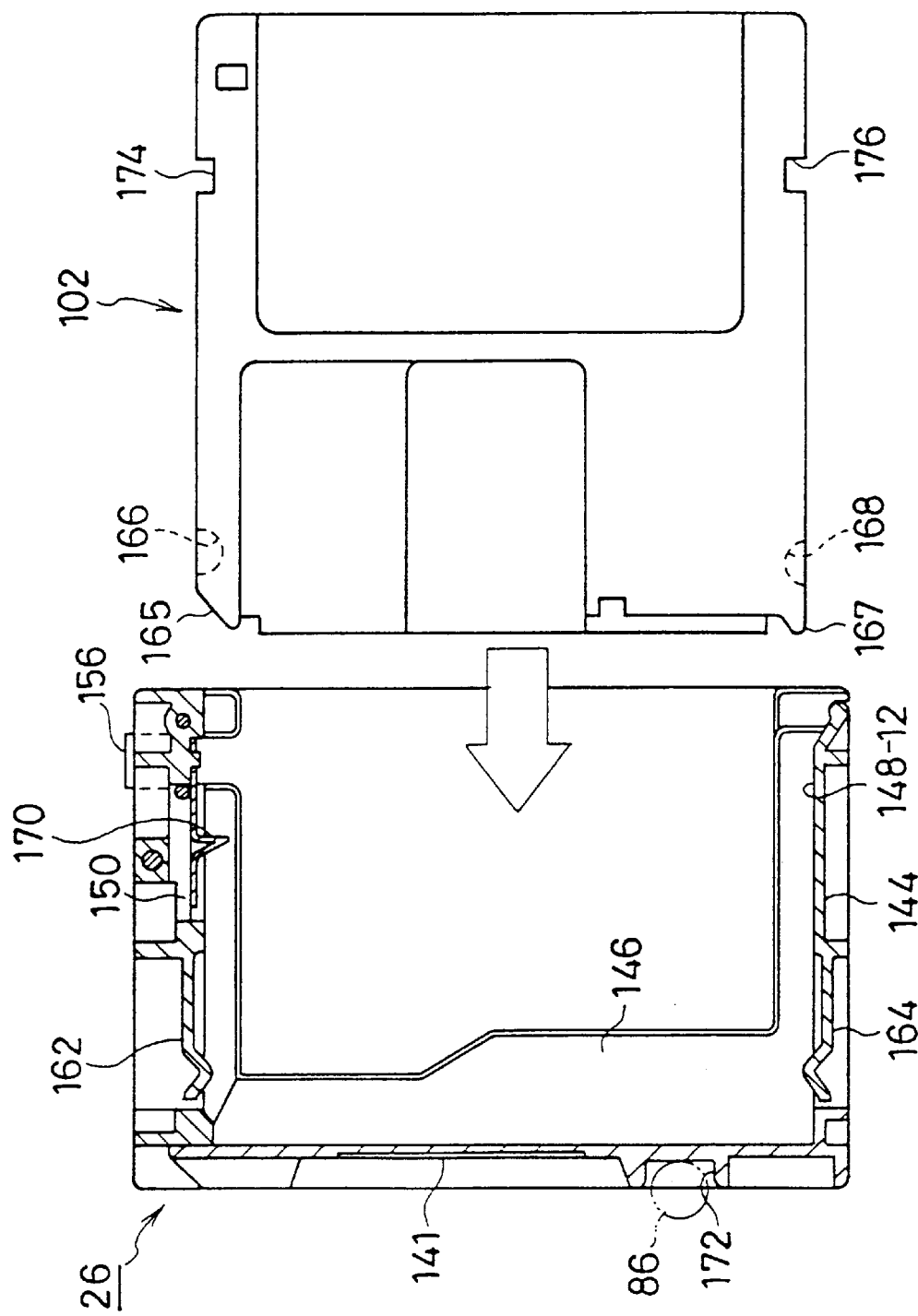
FIG. 17 is a vertical sectional view of the magazine rack shown together with a cartridge.

FIG. 17 is a vertical sectional view of the portion of the left slot 148-12 in the magazine rack 26 in FIG. 15. The partition 146 forming the slot 148-12 is formed from the lower portion to the depth side and, further, to the upper portion. In the embodiment, the bottom wall 144 and rear wall 141 are integratedly formed. The upper wall 150 is fixed to those walls by a screw, an adhesive agent, or the like. Stoppers 162 and 164 are integratedly formed in the rear side of the slot 148-12 of the upper wall 150 and lower wall 144. The stoppers 164 and 162 are supported to the main body side in the central portion, thereby making their front edge sides movable. For example, as shown in FIG. 16, the stopper 164 of the bottom wall 144 has a structure such that a nail portion at the edge is deformable by a cantilever formation. An anti-insertion preventing nail 170 is provided on the entrance side of the slot 148-12 of the upper wall 150. In the embodiment, a metal plate spring is used as an anti-insertion preventing nail 170. As such a metal plate spring, one blade plate in which twelve anti- insertion preventing nails 170 are formed with regard to all of the twelve slots is formed and is fixed to the lower portion of the upper wall 150 as shown in FIG. 17, thereby supporting the anti-insertion preventing nails 170. The cartridge 102 of the optical disk of 3.5 inches shown on the right side is inserted into the slot 148-12 of the magazine rack 26. The cartridge 102 has grooves 166 and 168 on the upper and lower edge sides. The stoppers 162 and 164 of the magazine rack 26 are inserted into the grooves 166 and 168. A taper portion 165 is provided at the upper edge of the cartridge 102 and a projection 167 is provided at the lower edge. The taper portion 165 and projection 167 are provided to prevent the anti-insertion of the cartridge 102. In correspondence to such an anti-insertion preventing structure on the cartridge 102 side, the anti-insertion preventing nail 170 is provided at the slot position of the upper wall 150 on the magazine rack 26 side. As shown in the diagram, when the cartridge 102 is inserted into the slot 148-12 of the magazine rack 26 in the correct direction, the anti-insertion preventing nail 170 is pushed up by the taper portion 165. The cartridge 102 can be enclosed to the correct position where the stoppers 162 and 164 are fitted into the grooves 166 and 168. On the other hand, in the case where the cartridge 102 is inserted upside down, the lower projection 167 collides with the anti-insertion preventing nail 170, so that the cartridge 102 cannot be inserted any more. Therefore, the anti-insertion of the cartridge can be known. Further, a locking groove 172 is formed in the lower portion of the rear wall 141 of the magazine rack 26. The locking member 86 provided for the bottom wall 108 of the tray 20 in FIG. 8 is inserted into the locking groove 172, thereby holding.

Figure 18:
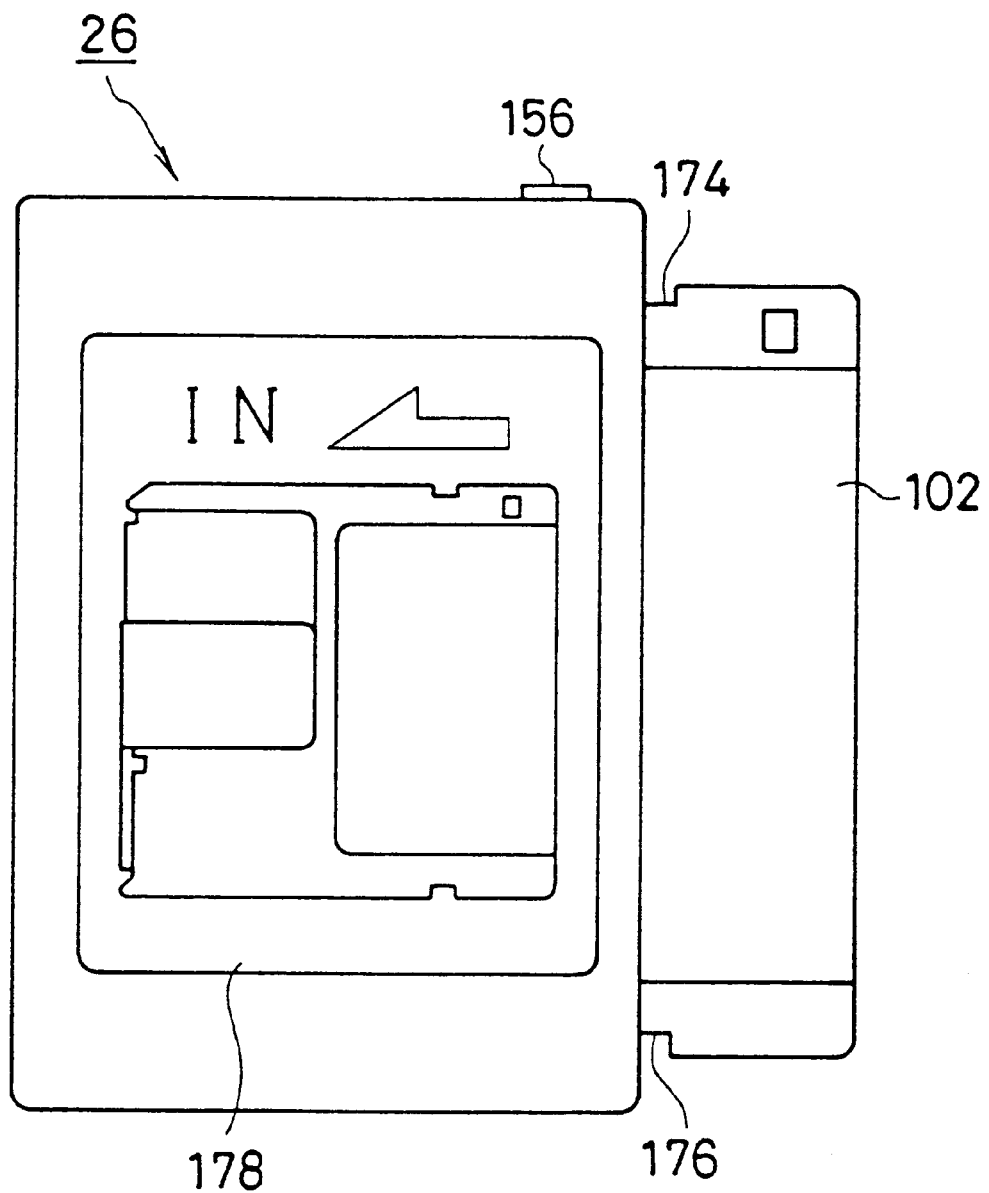
FIG. 18 is a side elevational view of the magazine rack in a cartridge enclosing state of the invention.

FIG. 18 is a side elevational view in the cartridge enclosing state of the magazine rack 26 of the invention. The magazine rack 26 of the invention does not have a structure adapted to enclose all of the cartridges 102, but each cartridge is enclosed in a state in which a part of the cartridge is projected to the outside. Namely, the cartridge 102 is enclosed in a state in which upper and lower rectangular grooves 174 and 176 are exposed to the outside. Nails of the pickers 56-1 and 56-2 of the accessor 28 shown in FIG. 3 are inserted into the rectangular grooves 174 and 176. In the magazine rack 26 of the invention, a label 178 is adhered to the side wall. A picture showing the direction of the cartridge 102 upon insertion and "IN" and an arrow indicative of the inserting direction are drawn on the label 178. By adhering such a label 178 to the magazine rack 26, the cartridge 102 can be easily inserted into the magazine rack 26 in the correct direction.

Figure 19:
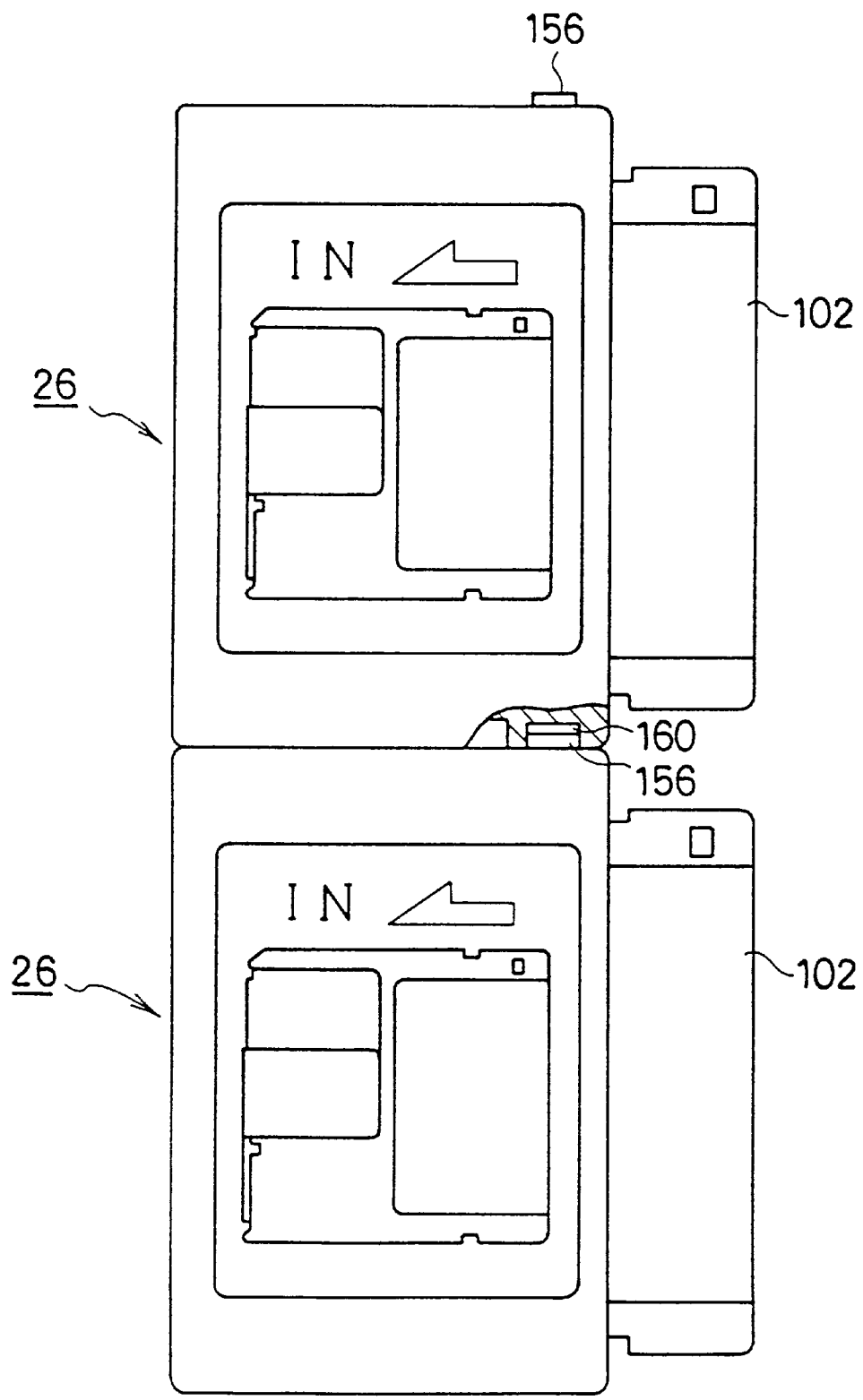
FIG. 19 is an explanatory diagram in a state in which two magazine racks of the invention are stacked.

FIG. 19 shows a state in which two magazine racks 26 of the invention are stacked. Each of the magazine racks 26 has the projection 156 in the upper portion. When the upper magazine rack 26 is stacked onto the projection 156 of the lower magazine rack 26, as shown in its cross sectional portion, the projection 156 on the lower side is fitted into the reception hole 160 of the upper magazine rack 26, thereby eliminating the positional deviation of the magazine racks 26 in the state. Thus, the magazine racks can be aligned on a desk or the like in order.

Further, the magazine rack 26 of the invention has a whole shape of an almost cube as will be obviously understood from the side elevational view of FIG. 18 in which the cartridges are enclosed in all of the slots 148-1 to 148-12 in FIG. 15. By having a cubic shape as a whole in such a cartridge enclosing state, a stability in case of arranging the magazine racks on the desk or the like can be raised. By grasping the handle 112 by the single hand, the magazine rack 26 of the invention is attached or detached to/from the tray of the apparatus. Therefore, it is necessary to set the weight of the magazine rack to a value such that it can be easily handled by the single hand. For this purpose, the magazine rack of the invention has a structure such that in case of enclosing the cartridges of the optical disk of 3.5 inches, a weight of magazine rack is suppressed to 500 grams or less as a weight such that it can be easily handled by the single hand, so that twelve cartridges can be enclosed per one magazine rack. Together with the weight, the reason why the number of cartridges which are enclosed is set to 12 is to realize a cubic shape as a whole as shown in FIG. 18.

[Hard disk emulation]

Figure 20:
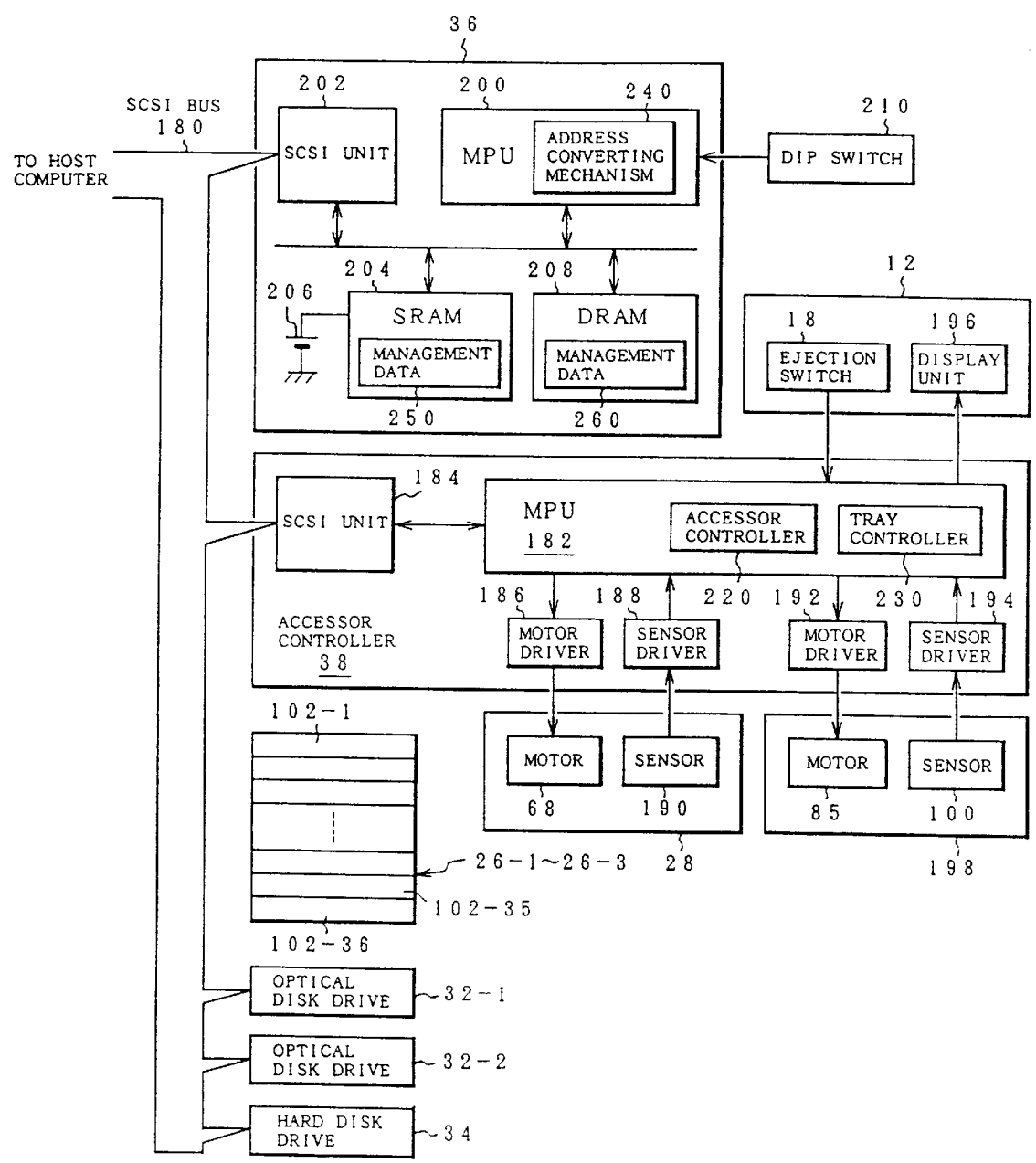
FIG. 20 is a circuit block diagram of a hardware construction of the invention.

FIG. 20 is a block diagram of a hardware construction of the optical disk library apparatus according to the invention. In FIG. 20, an SCSI bus 180 is connected from the host computer to the emulation unit 36, accessor controller 38, optical disk drives 32-1 and 32-2, and hard disk drive 34. The accessor controller 38 has an MPU 182 and realizes functions of an accessor controller 220 and a tray controller 230 by a program control of the MPU 182. The MPU 182 connects the SCSI bus 180 from the host computer through an SCSI unit 184. The MPU 182 also controls a motor driver 186 to drive the motor 68 provided for the accessor 28. A sensor driver 188 to output a detection signal from the sensor 190 for detection of the cartridge position provided for the accessor 28 is inputted and connected. A motor driver 192 to drive the motor 85 provided for a tray driving mechanism 198 is connected. A sensor driver 194 to output a detection signal of the sensor 100 to detect the tray position is connected. Further, the ejection switch 18 which is provided on the console panel 12 and is used to instruct the loading or unloading of the tray is connected. A display unit 196 which is provided on the console panel 12 and has various kinds of indicators is also connected. The emulation unit 36 has an MPU 200. An SCSI unit 202, an SRAM 204, and a DRAM 208 are connected to the MPU 200 through a bus. A backup power source 206 using a battery is connected to the SRAM 204, so that the SRAM 204 is used as a non-volatile memory. A dip switch 210 to select either one of a plurality of emulation forms which the emulation unit 36 previously has is connected to the MPU 200. The dip switch 210 is provided on a rear panel or the like of the apparatus main body and can perform a setting to select the emulation form from the outside of the apparatus. The MPU 200 is provided with an address converting mechanism 240 to perform an address conversion of the selected emulation form on the basis of a selection instruction of the emulation form by the dip switch 210. The address converting mechanism 240 converts an effective address (logic address) in association with a write or read access request from the host computer by the SCSI bus 180 to an address of the optical disk adapted to the selected emulation form. Management data 250 serving as a target of the hard disk emulation and using the serial number of the optical disk as an entry has been registered in the SRAM 204 as a non-volatile memory. As management data 250, installation data indicative of the presence or absence of the insertion is stored in correspondence to the serial number of each optical disk. Further, in addition to the installation data indicative of the presence or absence of the insertion, other management data such as year, month, and day of the storage, the number of ejecting times for cleaning the media, flag indicating whether the optical disk has been formatted or unformatted, and the like are also stored. The emulation unit 36 of the invention previously has three hard disk emulation forms of type 1, type 2, and type 3 for 35 optical disk cartridges 102-1 to 102-35 as targets enclosed in the magazine racks 26-1 to 26-3. Either one of the three types is selected by the dip switch 210.

In the emulation form of the type 1, the 35 optical disk cartridges are made to look like one hard disk of a large capacity. Now, assuming that each optical disk cartridge of 3.5 inches has a capacity of 230 MB, one hard disk of a large capacity of 8.1 GB can be emulated. In the type 2, each of the 35 optical disk cartridges 102-1 to 102-35 is handled as one volume of the hard disk. Further in the type 3, the 35 optical disk cartridges 102-1 to 102-35 are classified into groups each consisting of a predetermined number of optical disk cartridges and each group is handled as one volume of the hard disk. For example, in the embodiment, the hard disk of 1.35 GB is emulated by the six optical disk cartridges, so that the optical disk cartridges are handled as total six hard disks. The address conversion is executed in the following manner by the address converting mechanism 240 of the MPU 200 in each of the types 1 to 3. First in the type 1, all of the 35 optical disk cartridges enclosed are made to look like one hard disk. Now, assuming that the disk numbers as serial numbers of the 35 optical disk cartridges are set to 0 to 35 the disk number to specify the optical disk cartridge on the basis of the effective address as an access address from the host computer is given by the following equation (1).

$$\text{Disk number} = \text{quotient of} \frac{\text{(effective address)}}{\text{(maximum address of optical disk)}} \quad (1)$$

When the disk number as a target is obtained on the basis of the effective address from the host computer as mentioned above, the optical disk address as an address in the optical disk is obtained by the following equation (2).

$$\text{Optical disk address} = \text{(effective address)} - \quad (2)$$
$$\text{(maximum address of optical disk)} \times \text{(disk number)}$$

In the selection of the emulation form of the type 1 as mentioned above, unless all of the 35 optical disk cartridges are enclosed in the apparatus, they cannot be used. In the type 2, since each of the 35 optical disk cartridges constructs one hard disk, when the effective address as an access address from the host computer is designated, the number of the hard disk is designated. Therefore, the disk number of the optical disk cartridge can be specified by the designation of the hard disk number. The subsequent effective address becomes the optical disk address itself of the designated disk number. That is, it is sufficient to execute the address conversion such that $$\text{Optical disk address} = \text{effective address} \quad (3)$$

Further in the type 3, the host computer designates the hard disk to be used by the emulation by a logical unit number (LUN). Therefore, so long as the optical disk cartridges of the number as many as at least one logical unit number, namely, at least five or six optical disk cartridges are correctly enclosed, they can be used with respect to the designated LUN. The head disk numbers in the every five or six optical disk cartridges corresponding to the LUN that is designated by the host computer are as shown in FIG. 21A. The address conversion based on the designation of the LUN from the host computer and the effective address in the type 3 as mentioned above is executed in the following manner. First, the head disk number is obtained from the designated LUN with reference to FIG. 21B, the effective address is substituted in the following equation (4), and the disk number as an access target is obtained.

$$\text{Disk number} = (\text{designated LUN head disk number}) + \text{quotient of} \frac{(\text{effective address})}{(\text{maximum address of optical disk})} \quad (4)$$

Subsequently, the optical disk address of the disk number calculated by the equation (4) is obtained by the following equation (5).

$$\text{Optical disk address} = \quad (5)$$
$$\text{effective address} - (\text{maximum address of optical disk}) \times$$
$$(\text{disk number} - \text{designated LUN head disk number})$$

The number of optical disk cartridges which were grouped in the type 3 can be properly determined by the use of the OS of the host computer.

FIG. 22 shows an example of the management data 250 that is stored into the SRAM 204 of the emulation unit 36 in FIG. 20. In the management data, installation flags indicative of the presence or absence of the insertion of the optical disk cartridge are provided in correspondence to the disk numbers #00 to #35 indicative of the optical disk cartridge. When the optical disk cartridge is inserted, the installation flag is set to 1. When the optical disk cartridge is not inserted, the installation flag is reset to 0. As management information other than the installation, the year, month, and day of the storage, the number of loading times for the optical disk drive, the number of ejecting times for cleaning the media, a format flag indicative of the formatted state or unformatted state, and the like are recorded.

Figure 23:
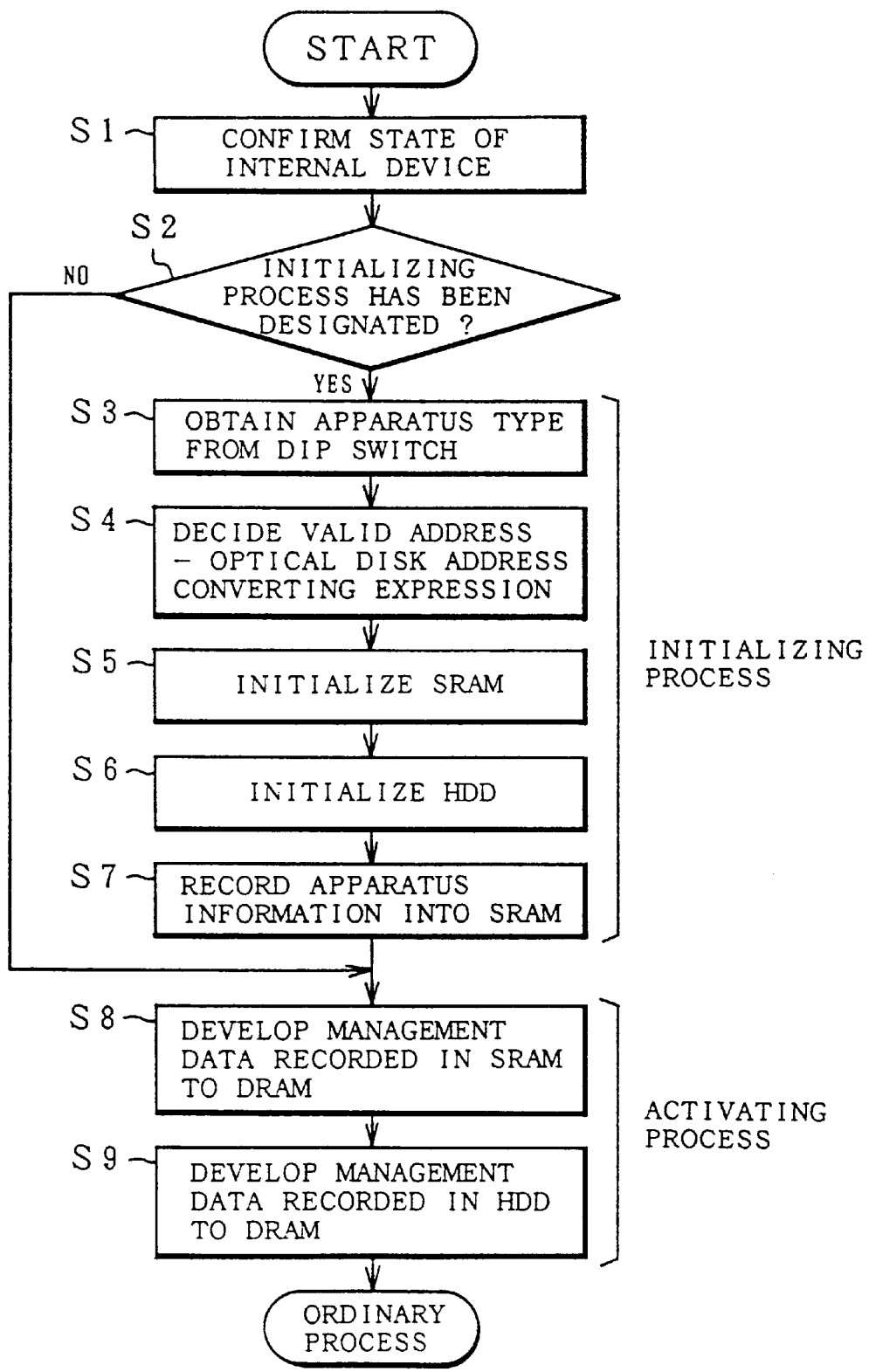

FIG. 23 is a flowchart for an initializing process at the time of turn-on of the power source and a leading process in the emulation unit 36 in FIG. 20. First, the initializing process when the optical library apparatus is connected to the host computer for the first time and the power source is turned on will be described. When the power source of the optical disk library apparatus is turned on, first in step S1, the state of the internal device is confirmed. In such a state confirmation, states of the optical disk drives 32-1 and 32-2, hard disk drive 34, and further accessor controller 38 are confirmed. At the same time, a check is also made to see if the optical disk cartridge has been enclosed in each slot of the magazine racks provided in the tray or not. When confirming the enclosing state of the optical disk cartridge, for example, the accessor 28 is moved by the accessor controller 38 and the presence or absence of the optical disk cartridge is detected at each slot position by the sensor 190 provided for the accessor 28. Subsequently in step S2, a check is made to see if the initializing process has been designated or not. Since the initializing process is designated in this case, step S3 follows. In step S3, the selection information of the emulation type set in the apparatus by the dip switch 210 is obtained. In step S4, the converting equation to convert the effective address from the host computer to the optical disk address is determined on the basis of the selection information of the emulation type obtained. For example, with respect to either one of the types 1 to 3, the address converting equation corresponding to the designated type is determined. In step S5, the SRAM 204 is initialized. Further in step S6, the hard disk drive 34 is initialized. In step S7, the information indicative of the presence or absence of the installation of the optical disk cartridge detected by the state confirmation in step S1 is recorded as management data 250 in the SRAM 204. Namely, when the optical disk cartridge is inserted, 1 is set into the installation flag in the management data in which the disk numbers #00 to #35 in FIG. 22 are used as entries. When the optical disk cartridge is not inserted, 0 is reset. By the processes in steps S3 to S7, the initializing process when the optical disk library apparatus is used for the host computer for the first time is finished. Leading processes in steps S8 and S9 are subsequently executed. First in step S8, the management data 250 recorded in the SRAM 204 is developed as management data 260 into the DRAM 208. In step S9, the management data recorded in the hard disk drive 34 is developed in the DRAM 208. In the first using state, since no management data is recorded in the hard disk drive 34, the process in step S9 in this case is unnecessary. The data to be stored into the DRAM exists in either one of the SRAM 204 and the hard disk drive 34. When the leading process is executed by the next power-on, the management data recorded in each of the SRAM 204 and hard disk drive 34 is developed in the DRAM 208 in steps S8 and S9.

Figure 24:
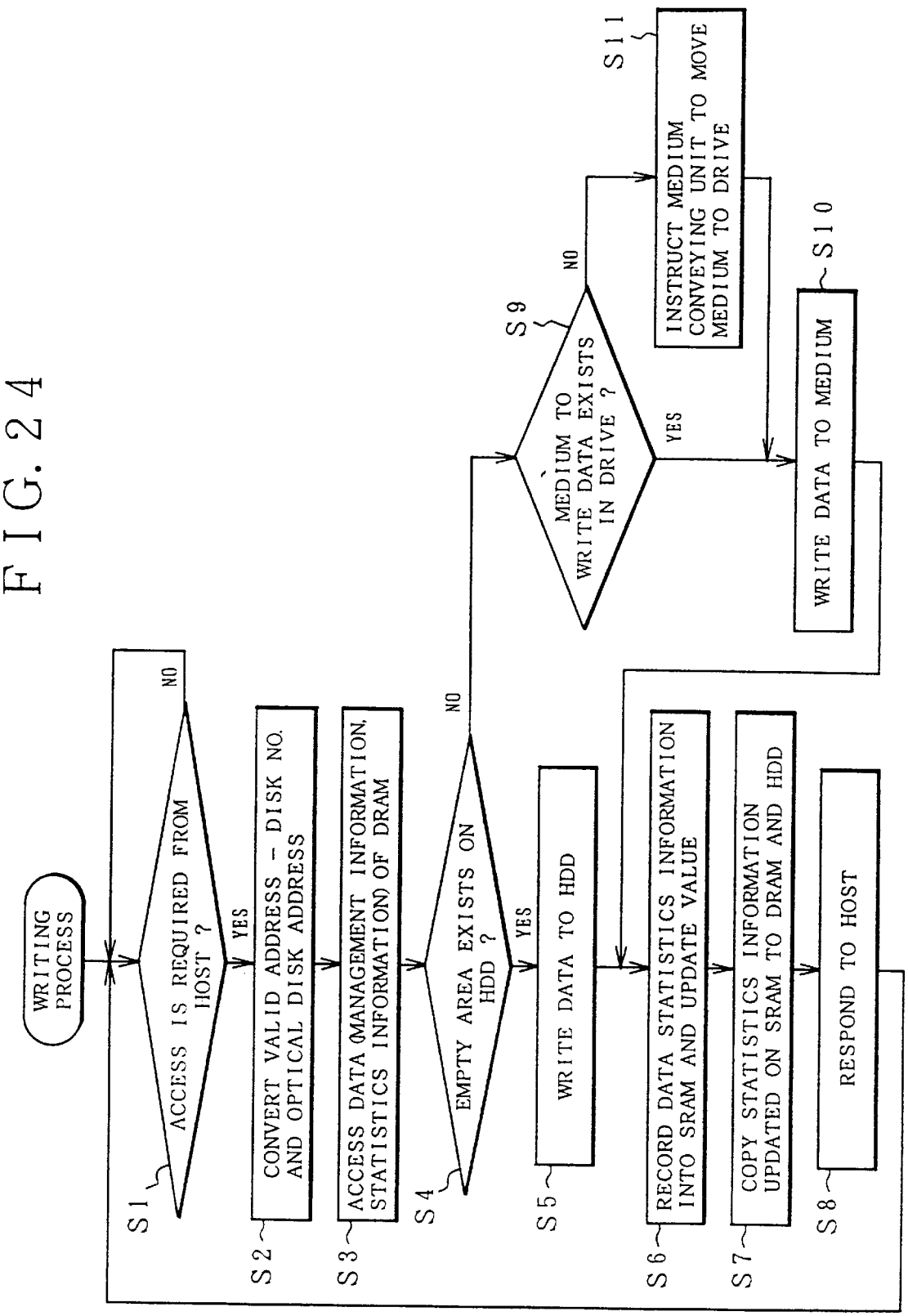
FIG. 24 is a flowchart for a writing process.

FIG. 24 is a flowchart for a writing process in the emulation unit 36 in FIG. 20. First in step S1, when there is an access request of the writing process from the host computer, in step S2, the effective address sent in association with the access request is converted to the disk number and the optical disk address of the optical disk cartridge by the address converting mechanism 240 having the converting equation of the emulation type selected at that time. In step S3, with reference to the management data in the DRAM 208, a check is made to see if the installation flag of the designated disk number has been set to 1 or not. In step S4, a check is made to see if an empty area exists in the hard disk drive which operates as a cache or not. When there is an empty area, data is written into the hard disk drive 34 in step S5. When there is no empty area in the hard disk drive 34 in step S4, step S9 follows and a check is made to see if the medium to write the data exists in either one of the optical disk drives 32-1 and 32-2 or not. If YES, the data is written to the medium in step S10. When the medium is not in the drive, step S11 follows and the movement of the medium is instructed to the accessor controller 38. In step S10, the data is written to the moved medium. When the data writing operations in steps S5 and S10 are finished, the information on the management derived by the writing is recorded in the management data 250 in the SRAM 204 and is updated in step S6. Further in step S7, the contents of the management data 250 updated in the SRAM 204 are copied to the management data 260 in the DRAM 208 and to the management data of the hard disk drive 34 and are reflected to them. Finally in step S8, a normal end for the write access is responded.

Figure 25:
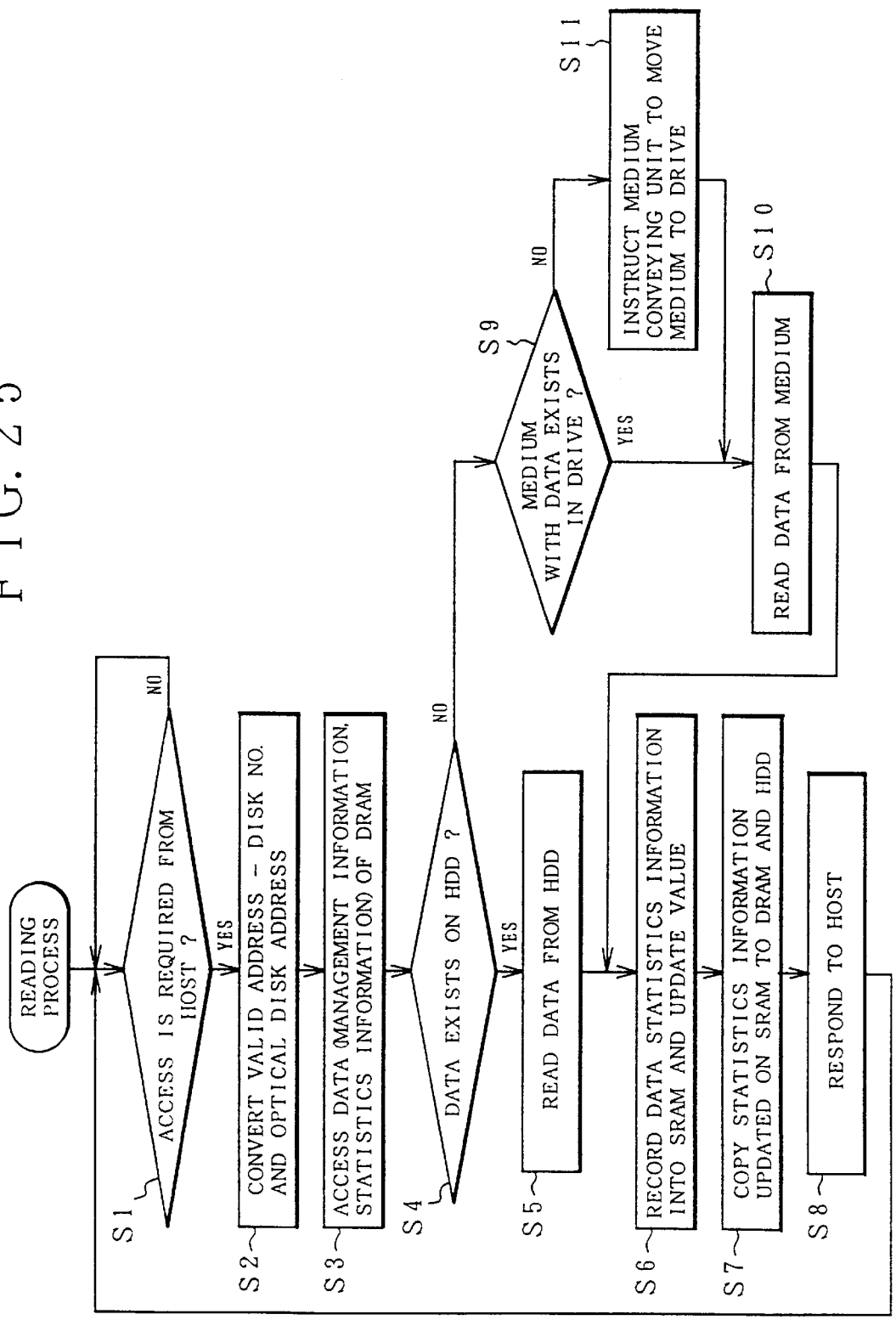
FIG. 25 is a flowchart for a reading process.

FIG. 25 is a flowchart for a reading process of the emulation unit 36 in FIG. 20. When there is an access request of the reading process from the host computer in step S1, the effective address is converted into the disk number and optical disk address in accordance with the converting equation of the emulation type designated at that time in step S2. The management data 260 in the DRAM 208 is accessed in step S3. In step S4, a check is made to see whether or not the data exists in the hard disk drive 34 which operates as a cache. If YES, the data is read out from the hard disk drive 34 in step S5. When no data exists in the hard disk drive 34, a check is made in step S9 to see whether or not the medium having the data exists in either one of the optical disk drives 32-1 and 32-2. If YES, the data is read out from the medium in step S10. When the medium having the data doesn't exist in both of the optical disk drives 32-1 and 32-2, the movement of the medium designated by the disk number to, for example, the optical disk drive 32-1 is instructed to the accessor controller 38 in step S11. After completion of the medium movement, the data is read out from the medium in step S10. When the data reading operation in step S5 or S10 is finished, in step S6, the management data in association with the data reading operation is recorded into the management data 250 in the SRAM 204 and is updated. In step S7, the updated data is copied to the management data 260 in the DRAM 208 and to the management data in the hard disk drive 34. Finally in step S8, a normal end is responded to the host computer. In the hard disk drive 34 which operates as a cache, the data written in the hard disk drive 34 by the writing process in FIG. 24 is managed by, for example, the LRU method. When the access is not performed for a time exceeding a predetermined time, a write back operation for sweeping out the data from the hard disk drive 34 and for writing into the optical disk cartridge of the corresponding disk number is executed.

FIG. 26 is a flowchart showing processes in the case where the emulation form is changed during the operation of the optical disk library apparatus of the invention. First in step S1, the write back process for reflecting all of the data stored in the hard disk drive 34 which is at present operating as a cache to the optical disk cartridge is executed. Thus, the newest data existing in the hard disk drive 34 is reflected to each optical disk cartridge. In step S2, the optical disk cartridge is ejected out of the apparatus. Specifically speaking, by operating the ejection switch 18 after the key switch 16 of the console panel 12 of the main body in FIG. 1, the tray is pulled out. The magazine racks 26-1 to 26-3 are taken out as shown in FIG. 8. A magazine rack in which new optical disk cartridges are stored is enclosed into the tray. After the magazine rack was enclosed, by depressing the ejection switch 18, the tray is closed. In step S3, in a state in which the power source of the apparatus is turned off by the power switch 14, the switch to change over the type of the emulation form is set by the dip switch 210. After that, the power source is turned on by the power switch 14. The initializing processes shown in steps S3 to S7 in the flowchart of FIG. 23 are executed. Further if necessary, in step S4, an optical disk cartridge medium is newly inserted or the medium used before in the type after the change is inserted. The selection to switch the type of the emulation form in step S3 has been performed by the dip switch 210 in FIG. 20. However, as means other than the dip switch 210, it is also possible to use a method of designating by the mode selection of an SCSI command from the host computer or a method whereby a selecting switch of the emulation form is provided for the console panel 12 of the optical disk library apparatus and such a selection is performed by the switching operation of such a selecting switch. In the optical disk library apparatus of the invention, when the type of the emulation form is changed, a case where the unformatted optical disk cartridges are stored in the magazine rack 26-1 at random as shown in FIG. 27A is presumed. As mentioned above, even if the unformatted media are stored at random, by exchanging the media to the slots by the accessor 28 after they were inserted, the unformatted optical disk cartridges can be exchanged to the head disk numbers 0 to 5 as shown in FIG. 27B. Such an exchange is effective in case of., for example, changing the type to the emulation form of the type 3. That is, in the emulation form of the type 3, with respect to each of the LUNs 0 to 5, it is necessary to enclose the unformatted optical disk cartridges which are continuous. When the unformatted optical disk cartridges are stored at random as shown in FIG. 27A, the emulation cannot be realized with regard to each of the LUNs 0 to 5. Therefore, as shown in FIG. 27B, by exchanging the unformatted optical disk cartridges to the disk numbers 0 to 5, the emulation of the disk numbers 0 to 4 of LUN 0 can be realized.

Figure 28:
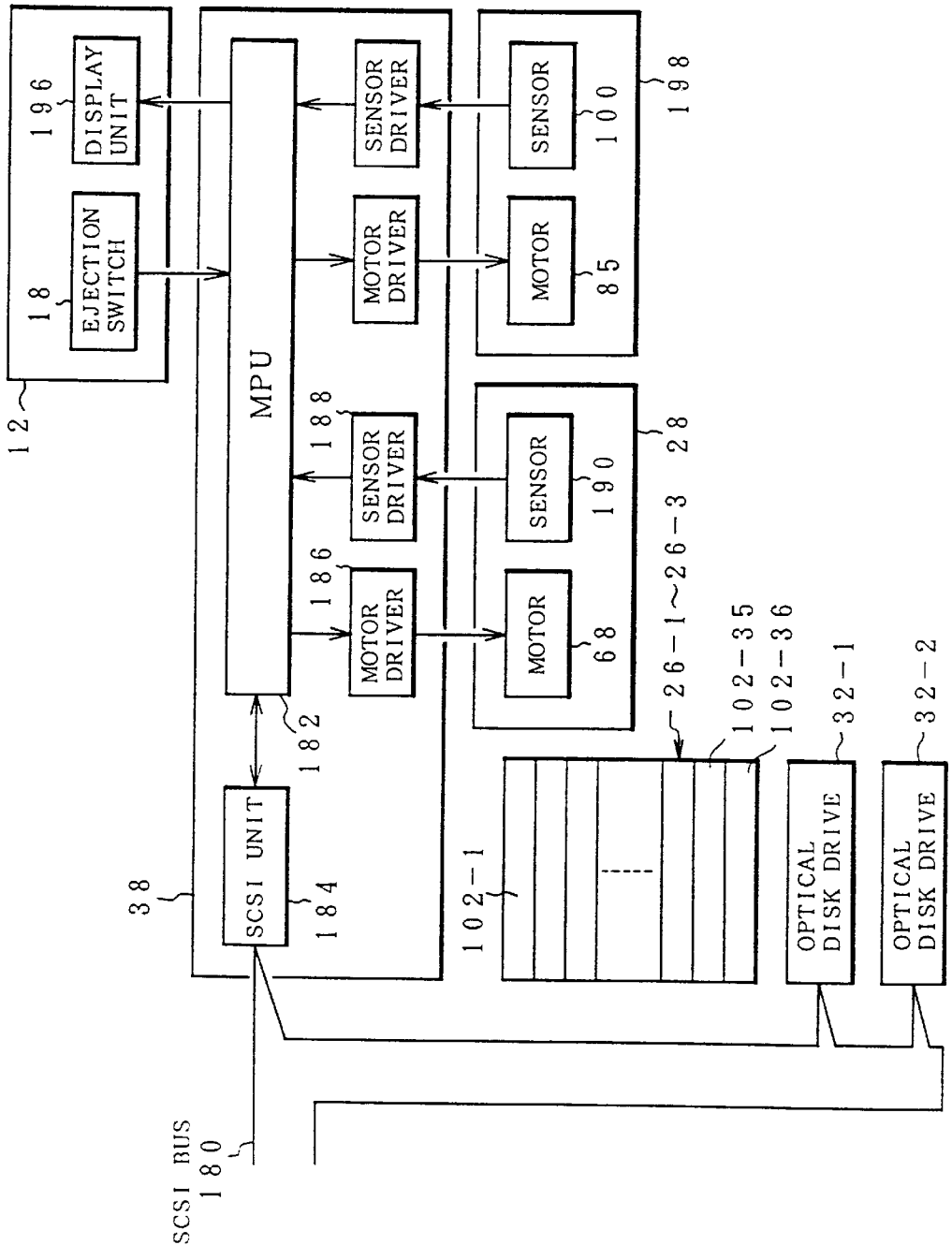
FIG. 28 is a circuit block diagram showing another embodiment of a hardware construction of the invention.

FIG. 28 shows another embodiment of a hardware construction of the optical disk library apparatus of the invention. The embodiment is characterized in that the emulation unit 36 in the embodiment of FIG. 20 is removed and one optical disk drive 32-1 is used. Namely, assuming that the construction of FIG. 20 is the maximum construction, it is possible to consider that the optical disk library apparatus of the invention has the minimum construction of FIG. 28. The embodiment is almost the same as the foregoing embodiment except that it doesn't have the emulation function. A proper construction can be also realized in a range from the maximum construction of FIG. 20 and the minimum construction of FIG. 28.

[Control of tray]

When the ejection switch 18 is operated in the closing state of the tray 20, the tray controller 230 that is realized by the program control of the MPU 182 provided for the accessor controller 38 in FIG. 20 drives the motor 85 by the motor driver 192 and, fundamentally, feeds the tray 20 to a full-open position as shown in FIG. 8. However, in dependence on the installing position of the optical disk library apparatus of the invention, an object is put in front of the tray 20 and the tray 20 cannot be fed to the full-open position in FIG. 8. By considering a situation such that the opening position of the tray 20 is limited, an ejection amount of the tray 20 can be arbitrarily set for the tray controller 230. The tray ejection amount can be set on a unit basis of three magazine racks 26-1 to 26-3 or a slot unit basis of each of the 36 slots which are realized by the three magazine racks 26-1 to 26-3.

Figure 29:
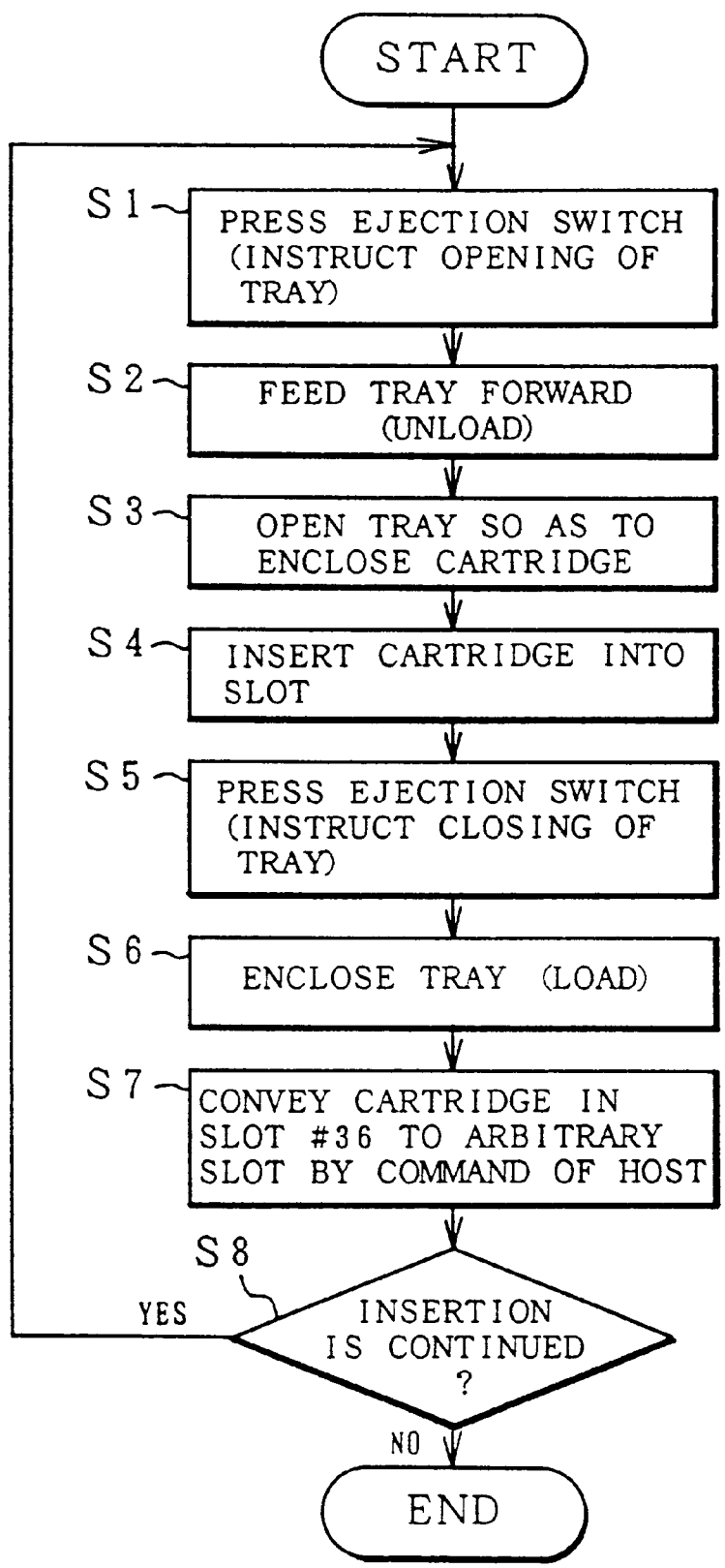
FIG. 29 is a flowchart for a control in the case where a tray ejection amount is set to a small value.

FIG. 29 is a flowchart for a tray process in the case where the tray ejection amount is set to a value that is equal to or less than the ejection amount of the head magazine rack 26-1 for the tray controller 230 in FIG. 20. First in step S1, when the ejection switch 18 is depressed in the closing state of the tray 20, the tray 20 is fed forward in step S2. Such a feed amount is determined by a preset tray ejection amount. In step S3, the tray 20 is opened into a state in which the cartridge can be enclosed. In this case, since the cartridges of a magazine rack unit cannot be enclosed, the cartridge is inserted into an arbitrary slot of the magazine rack of the tray that is opened, for example, into the frontmost slot. In this state, when the ejection switch 18 is depressed in step S5, the feeding operation to load the tray 20 is executed in step S6. When the tray 20 is loaded, in step S7, the cartridge of the disk number 36 inserted to the frontmost slot is conveyed to another slot which needs the insertion of the cartridge under a control of the accessor 28 by an instruction from the host computer. In step S8, a check is made to see if the insertion is continued or not. If YES, the processing routine is returned to step S1 and the above processes are repeated. In the above procedure, the case where the cartridges are inserted one by one to the frontmost slot of the slot No. #36 has been described. However, after the cartridges were simultaneously inserted to a plurality of slots, they can be also conveyed to the slot which needs the insertion of the cartridge by the accessor. Therefore, in the optical disk library apparatus of the invention, when the tray 20 is opened to the ejecting position where one cartridge can be inserted, the cartridge can be inserted or ejected on a unit basis of at least one cartridge.

Figure 30:
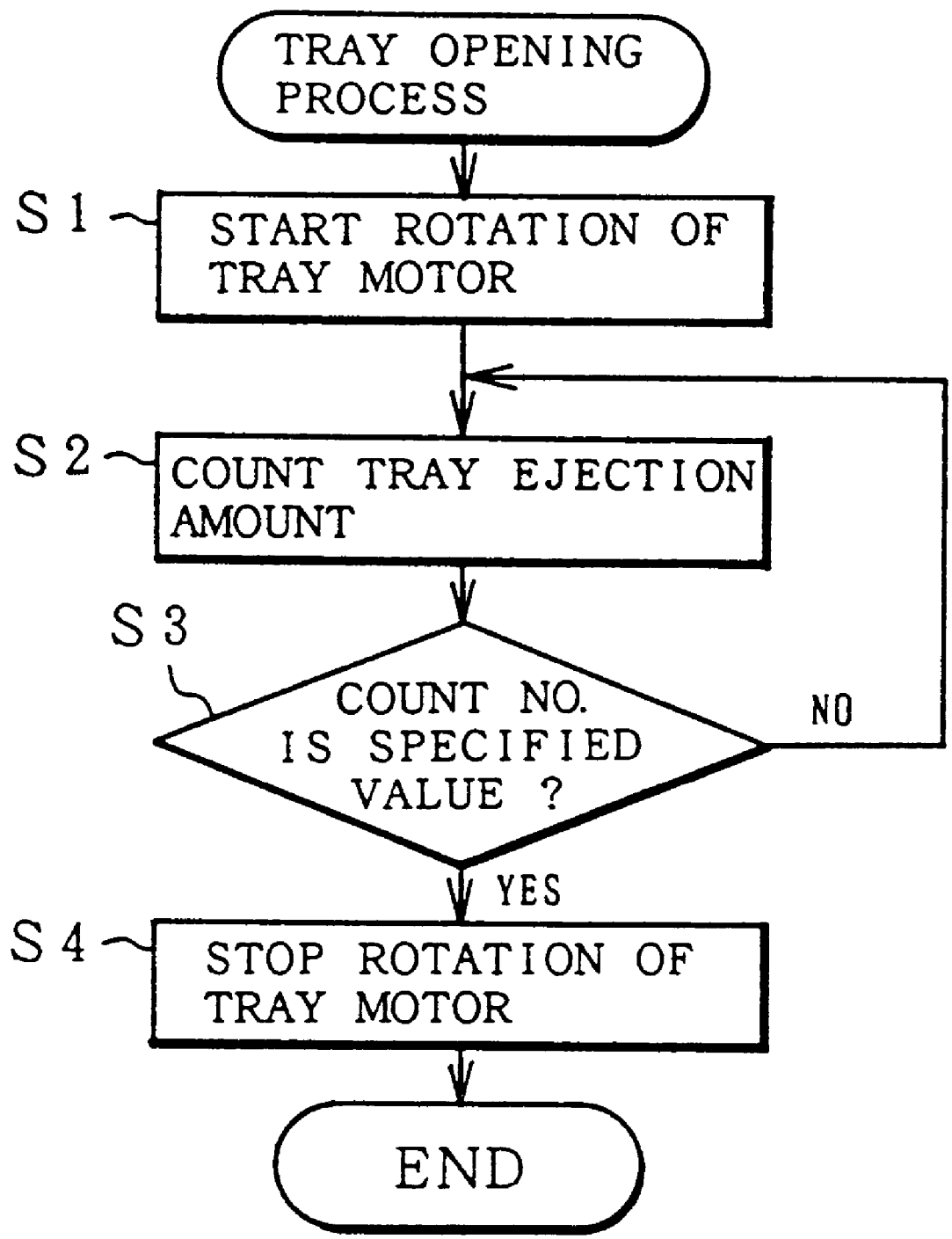
FIG. 30 is a flowchart for a tray opening process.

FIG. 30 is a detailed flowchart for the tray opening process in step S2 in FIG. 29. In step S1, when the rotation of a motor of the tray is started, a set tray ejection amount is counted in step S2. A check is made in step S3 to see whether or not the count value is equal to a set specified value. If YES, the motor rotation of the tray is stopped in step S4.

In the opening process of the tray in FIG. 30, an operation to monitor an abnormality of the tray operation in a sensor detecting process to count the tray ejection amount will now be described. FIG. 31A shows a detection pulse train from the sensor 100 by the sensor driver 194 in the ejecting operation of the tray in a lightest state in which no cartridge is put in the tray. For such a detection pulse train of the sensor of FIG. 31A, as shown in FIG. 31B, a predetermined sampling time Ts from the leading of the detection pulse is set, a monitoring timer is activated after the elapse of the sampling time Ts, and a predetermined monitoring time Tw is set. When the detection pulse of FIG. 31A is turned on for the monitoring time Tw, it is recognized that the ejecting operation of the tray is normally performed. On the other hand, when the detection pulse is turned on at a time out of the monitoring time Tw, it is judged that an abnormality occurs in the motion of the tray. However, as compared with the case where no cartridge is inserted in the tray 20 in FIG. 31, a weight of tray 20 when the cartridges are inserted into all of the slots is fairly heavy. On the other hand, since a motor of a relatively low torque is used in order to reduce the size and weight of the apparatus, a speed is reduced in case of the maximum weight of the tray and an interval of the detection pulses is long as shown in FIG. 32A. In such a case, when the monitoring time Tw after the elapse of the fixedly predetermined sampling time Ts is set as shown in FIG. 32B, it is judged that an abnormal operation of the tray occurs due to the turn-on of the detection pulse at a time out of the monitoring time Tw in spite of the fact that the tray normally operates. To prevent such an error of the monitoring operation which is caused due to a speed fluctuation in association with a change in weight of the tray, in the tray controller 230 in FIG. 20, a sampling period is measured from a period of one or a plurality of detection pulses just after the start of the ejecting operation of the tray. The sampling time of the monitoring time Tw is set on the basis of the measured period.

Figures 33A, 33B:
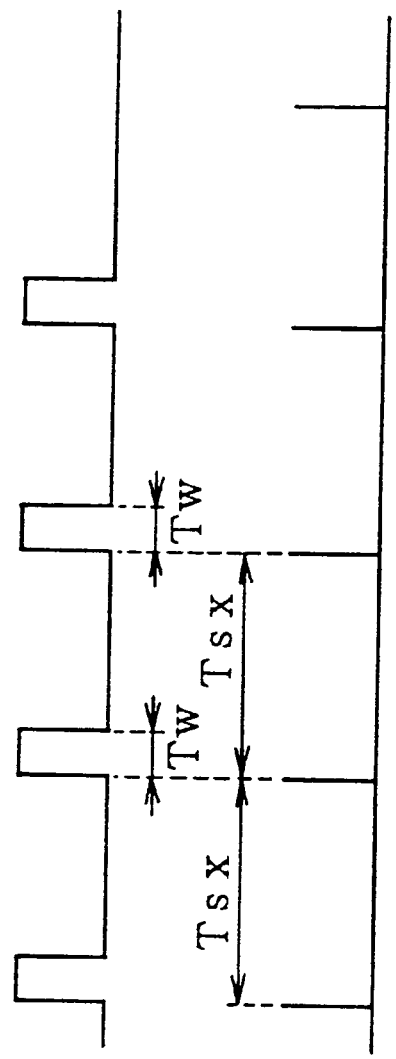
FIGS. 33A and 33B are time charts in the case where a period of the detection pulse is measured and a sampling time and a monitoring time zone are set.

FIGS. 33A and 33B show a setting of the sampling time based on the measurement of the period of the detection pulses and relates to a case of the maximum weight in which all of the optical disk cartridges are installed in the tray 20. As shown in FIG. 33A, the pulse interval of the detection pulses is long due to a decrease in speed. Therefore, as shown in FIG. 33B, a period Tsx of the detection pulses is measured. The measured period Tsx is set to a sampling time Tsx of FIG. 32B and, after that, the start time Tw is set. Therefore, even when the moving speed of the tray changes due to a change in tray weight, the start time Tw is set after the sampling time Tx based on the period of the detection pulse according to the speed change. When the tray normally operates, the detection pulse is turned on within a range of the monitoring time Tw. It is possible to certainly prevent that the abnormal operation is erroneously judged due to the speed fluctuation. The monitoring time Tw is not set to a constant time but is determined as a time to calculate at a predetermined ratio for the sampling time Tsx. Consequently, the time width of the optimum monitoring time Tw can be set in accordance with the fluctuation of the sampling time Tsx.

According to the invention, by first realizing a compact shape of the apparatus, a desk-top apparatus which can be put and used on the desk can be realized. An installation space of the library apparatus can be reduced and an easiness in use of the apparatus can be improved. Since the housing has the double structure, an object such as a display or the like can be put on the apparatus. Owing to the double structure on the base side of the housing, by assembling the driving mechanism of the accessor and tray and the other circuit units to the different bases, the assembly and the inspection repair can be easily performed. Further, since the path of the cooling air is formed by using the double structure of the housing, after the air taken from the outside was circulated in the apparatus, by finally exhausting the air from the power supply unit portion of the largest heat generation, a cooling efficiency can be raised. Further, the inserting/ejecting port of the cartridge used in the conventional apparatus is omitted. The cartridge can be inserted or ejected by the loading or unloading of the tray. For example, even in case of using a relatively large number (36) of media, the cartridges can be easily ejected out due to the tray structure without enlarging the apparatus.

According to the magazine racks which are used in the invention, the magazine rack has a box-like shape with the handle in the upper portion, the magazine rack can be easily inserted or ejected into/from the tray, and its weight is set to a value such that the rack can be easily grasped by the single hand, so that the rack can be easily handled. With respect to the magazine racks which are not used, they can be stacked and arranged on the desk or the like by using the upper and lower engaging structure and they can be easily arranged in order. Since the magazine rack has almost a cubic shape as a whole in a medium enclosing state, the stability in the case where the magazine rack is put on the desk is high and a space use efficiency in case of stacking the racks is also high. Further, since a part of the medium cartridge is projected without perfectly enclosing the cartridge into the magazine rack, a size of magazine rack can be made compact and a miniaturization of the apparatus is eventually realized. Moreover, since the anti-insertion preventing mechanism of the cartridge is equipped, a situation such that the cartridge is inserted in the wrong direction can be certainly prevented. Further, since the label indicative of the cartridge inserting direction is adhered to the side surface of the rack, the cartridge can be easily inserted into the rack.

According to the invention, further, the form that is necessary by the user can be selected on the apparatus side from a plurality of hard disk emulation forms. The apparatus can be used in the desired form of the user. Since the form that is used can be selected on the library apparatus side from the plurality of hard disk emulation forms, the apparatus is hardly limited by the OS of the host computer. Moreover, in order to select the form of the hard disk emulation, the medium serial numbers are registered and managed at the time of storage of the optical disk media, so that the normal operation can be managed on a medium unit basis on the apparatus side. In addition, at the time of a maintenance work, the recovery work to return the medium to the correct enclosing position with reference to the management information of the medium is reduced. Therefore, the manual difficulty in the recovery work can be reduced to the minimum necessary work. Manual errors can also be prevented. The present invention is not limited to the foregoing embodiments but many modifications and variations are possible within the spirit and scope of the appended claims of the invention. The invention is also not limited by the numerical values shown in the embodiments.

What is claimed is:

1. A magazine rack of an optical disk library apparatus, in which said magazine rack has a plurality of slots each for enclosing a medium and a plurality of said magazine racks are arranged in a depth direction of a tray which is movably provided in an opening of a front portion of the optical disk library apparatus, wherein said magazine rack has a box-shaped rack main body which is opened in a lateral direction of a loading/unloading direction of said tray in a tray enclosing state, and said rack main body has a handle that can be freely folded down in an upper portion, said rack main body further having an engaging portion adapted to come into engagement with another magazine rack when said magazine rack is placed upon said another magazine rack, said engaging portion being provided in each of upper and lower surfaces.

2. A magazine rack according to claim 1, wherein said rack main body has a weight such that said rack main body can be taken by one hand when media are enclosed in all of said slots.

3. A magazine rack according to claim 2, wherein in the case where said medium is an optical disk cartridge of 3.5 inches, said rack main body has 12 slots.

4. A magazine rack according to claim 1, wherein in said rack main body, an engaging projection is provided on an upper surface and an engaging reception hole is provided on a lower surface.

5. A magazine rack according to claim 1, wherein said rack main body encloses said medium into each of said slots in a state in which a part of said medium is projected to an inserting side and has a cube shape as a whole in a state in which said media are enclosed in all of said slots.

6. A magazine rack according to claim 1, wherein in said rack main body, stoppers adapted to be fitted into grooves on a medium side are formed at upper and lower inner positions of said slot.

7. A magazine rack according to claim 6, wherein said stopper is formed integratedly with the rack main body.

8. A magazine rack according to claim 1, wherein in said rack main body, an anti-insertion preventing nail to prevent an insertion of said medium in a vertical direction is provided at an entrance side of an upper inner surface of said slots.

9. A magazine rack according to claim 8, wherein in said anti-insertion preventing nail, one spring plate formed with a plurality of nail portions corresponding to the number of said slots is fixed to an entrance side of an upper inner surface of said rack main body.

10. A magazine rack according to claim 1, wherein in said rack main body, a label indicating a medium inserting direction is attached to a surface of said main body side.

11. A magazine rack of an optical disk library apparatus, in which said magazine rack has a plurality of slots each for enclosing a medium and a plurality of said magazine racks are arranged in a depth direction of a tray which is movably provided in an opening of a front portion of the optical disk library apparatus, wherein said magazine rack has a box-shaped rack main body which is opened in a lateral direction of a loading/unloading direction of said tray in a tray enclosing state, and said rack main body has a handle that can be freely folded down in an upper portion, said rack main body having an anti-insertion preventing nail to prevent an insertion of said medium in a vertical direction, said anti-insertion preventing nail being provided at an entrance side of an upper inner surface of said slots.

12. A magazine rack according to claim 11, wherein said rack main body has a weight such that said rack main body can be taken by one hand when media are enclosed in all of said slots.

13. A magazine rack according to claim 12, wherein in the case where said medium is an optical disk cartridge of 3.5 inches, said rack main body has 12 slots.

14. A magazine rack according to claim 11, wherein in said rack main body, an engaging portion adapted to come into engagement with another magazine rack when the magazine rack is placed upon said another magazine rack is provided in each of upper and lower surfaces.

15. A magazine rack according to claim 11, wherein in said rack main body, an engaging projection is provided on an upper surface and an engaging reception hole is provided on a lower surface.

16. A magazine rack according to claim 11, wherein said rack main body encloses said medium into each of said slots in a state in which a part of said medium is projected to an inserting side and has a cube shape as a whole in a state in which said media are enclosed in all of said slots.

17. A magazine rack according to claim 11, wherein in said rack main body, stoppers adapted to be fitted into grooves on a medium side are formed at upper and lower inner positions of said slot.

18. A magazine rack according to claim 17, wherein said stopper is formed integratedly with said rack main body.

19. A magazine rack according to claim 11, wherein in said anti-insertion preventing nail, one spring plate formed with a plurality of nail portions corresponding to the number of said slots is fixed to an entrance side of an upper inner surface of the main body.

20. A magazine rack according to claim 11, wherein in said rack main body, a label indicating a medium inserting direction is attached to a surface of said main body side.

* * * * *